United States Patent
Komada et al.

(10) Patent No.: US 11,814,128 B2
(45) Date of Patent: Nov. 14, 2023

(54) OPERATING DEVICE AND OPERATING SYSTEM FOR HUMAN-POWERED VEHICLE

(71) Applicant: SHIMANO INC., Sakai (JP)

(72) Inventors: Yasuyuki Komada, Sakai (JP); Kazuya Kuwayama, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/861,249

(22) Filed: Jul. 11, 2022

(65) Prior Publication Data
US 2022/0340226 A1  Oct. 27, 2022

Related U.S. Application Data

(63) Continuation of application No. 16/562,643, filed on Sep. 6, 2019, now Pat. No. 11,414,151.

(51) Int. Cl.
*B62J 99/00* (2020.01)
*B62M 25/08* (2006.01)
*B62M 6/45* (2010.01)
*B62J 45/20* (2020.01)

(52) U.S. Cl.
CPC ............... *B62J 99/00* (2013.01); *B62M 6/45* (2013.01); *B62M 25/08* (2013.01); *B62J 45/20* (2020.02)

(58) Field of Classification Search
CPC . B62J 99/00; B62J 45/20; B62J 45/41; B62M 6/45; B62M 25/08; B62M 2025/006; B62M 9/122; B62M 9/132; B62K 23/02; B62K 23/06
See application file for complete search history.

(56) References Cited

U.S. PATENT DOCUMENTS

| | | |
|---|---|---|
| 2003/0001357 A1 | 1/2003 | Fujii et al. |
| 2005/0187051 A1 | 8/2005 | Fujii et al. |
| 2006/0122015 A1 | 6/2006 | Takamoto et al. |
| 2007/0207885 A1 | 9/2007 | Watarai |
| 2009/0204299 A1 | 8/2009 | Miglioranza |
| 2010/0198453 A1 | 8/2010 | Dorogusker et al. |
| 2010/0244401 A1 | 9/2010 | Hara et al. |

(Continued)

FOREIGN PATENT DOCUMENTS

DE  10 2018 210 149  1/2019

OTHER PUBLICATIONS

Office Action with Form PTO-892 Notice of References Cited issued by the U.S. Patent and Trademark Office for the U.S. Appl. No. 16/562,643, dated Jan. 13, 2022.

*Primary Examiner* — Richard M Camby
(74) *Attorney, Agent, or Firm* — MORI & WARD, LLP

(57) ABSTRACT

An operating device for a human-powered vehicle comprises a base member, a first electrical switch, a second electrical switch, and a third electrical switch. The base member is configured to be coupled to a handlebar of the human-powered vehicle. The first electrical switch is configured to receive a first user input indicating upshifting of a first gear changing device. The second electrical switch is configured to receive a second user input indicating downshifting of the first gear changing device. The third electrical switch is configured to alternately receive a third user input and a third additional user input. The third user input indicates upshifting of a second gear changing device. The third additional user input indicates downshifting of the second gear changing device.

21 Claims, 16 Drawing Sheets

(56) References Cited

U.S. PATENT DOCUMENTS

| | | |
|---|---|---|
| 2012/0253601 A1 | 10/2012 | Ichida et al. |
| 2015/0073656 A1 | 3/2015 | Takamoto et al. |
| 2017/0021897 A1 | 1/2017 | Bortolozzo et al. |
| 2018/0229803 A1 | 8/2018 | Wesling |
| 2019/0002053 A1 | 1/2019 | Kakinoki |
| 2019/0315435 A1* | 10/2019 | Jordan .................. B62L 3/02 |
| 2020/0062340 A1* | 2/2020 | Tsai .................. G06F 1/3287 |
| 2020/0231249 A1* | 7/2020 | Ho .................. B62K 23/06 |

* cited by examiner

OPERATING DEVICE AND OPERATING SYSTEM FOR HUMAN-POWERED VEHICLE

CROSS-REFERENCE TO RELATED APPLICATIONS

The present application is a continuation application of the U.S. patent application Ser. No. 16/562,643 filed Sep. 6, 2019. The contents of this application are incorporated herein by reference in their entirety.

BACKGROUND OF THE INVENTION

Field of the Invention

The present invention relates to an operating device and an operating system for a human-powered vehicle.

Discussion of the Background

A human-powered vehicle includes an operating device.

SUMMARY OF THE INVENTION

In accordance with an aspect of the present invention, an operating device for a human-powered vehicle comprises a base member, a first electrical switch, a second electrical switch, and a third electrical switch. The base member is configured to be coupled to a handlebar of the human-powered vehicle. The first electrical switch is configured to receive a first user input indicating upshifting of a first gear changing device. The second electrical switch is configured to receive a second user input indicating downshifting of the first gear changing device. The third electrical switch is configured to alternately receive a third user input and a third additional user input. The third user input indicates upshifting of a second gear changing device. The third additional user input indicates downshifting of the second gear changing device.

In accordance with another aspect of the present invention, an operating device for a human-powered vehicle comprises a base member, a first electrical switch, a second electrical switch, and a third electrical switch. The base member is configured to be coupled to a handlebar of the human-powered vehicle. The first electrical switch is configured to receive a first user input indicating upshifting of a first gear changing device. The second electrical switch is configured to receive a second user input indicating downshifting of the first gear changing device. The third electrical switch is configured to operate a second gear changing device to upshift in response to a third user input in a first state of the second gear changing device. The third electrical switch is configured to operate the second gear changing device to downshift in response to the third user input in a second state of the second gear changing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
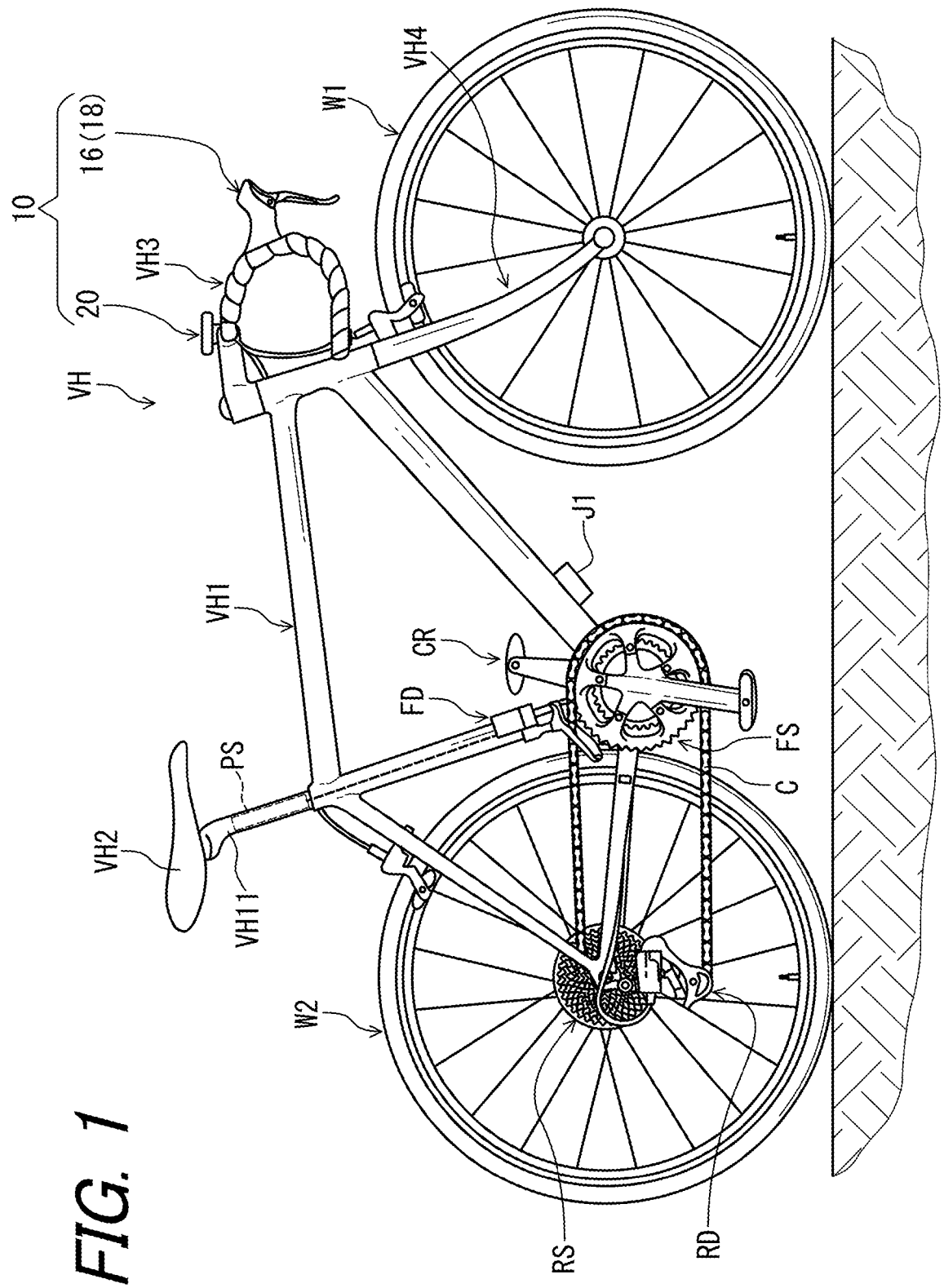
FIG. 1 is a side elevational view of a human-powered vehicle including an operating system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an operating system 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating system 10 can be applied to mountain bikes or any type of human-powered vehicles.

The human-powered vehicle VH further includes a vehicle body VH1, a saddle VH2, a handlebar VH3, a front fork VH4, a front wheel W1, and a rear wheel W2. The front fork VH4 is rotatably mounted to the vehicle body VH1. The handlebar VH3 is secured to the front fork VH4. The front wheel W1 is rotatably coupled to the front fork VH4. The rear wheel W2 is rotatably coupled to the vehicle body VH1.

In the present application, the following directional terms "front," "rear," "forward," "rearward," "left," "right," "ansverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the operating system 10 or other components, should be interpreted relative to the human-powered vehicle VH equipped with the operating system 10 as used in an upright riding position on a horizontal surface.

The human-powered vehicle VH includes a crank CR, a front sprocket assembly FS, a rear sprocket assembly RS, a chain C, an electric component RD, an electric component FD, and a power supply PS. The front sprocket assembly FS is secured to the crank CR. The rear sprocket assembly RS is rotatably mounted to the vehicle body VH1. The chain C is engaged with the front sprocket assembly FS and the rear sprocket assembly RS. The electric component RD is mounted to the vehicle body VH1 and is configured to shift the chain C relative to the rear sprocket assembly RS to change a gear position. Each of the electric components RD and FD includes a gear changing device such as a derailleur. Thus, the electric component RD can also be referred to as a first gear changing device RD. The electric component FD can also be referred to as a second gear changing device FD. The electric component FD is mounted to the vehicle body VH1 and is configured to shift the chain C relative to the front sprocket assembly FS to change a gear position. In this embodiment, the power supply PS is provided in a seatpost VH11 of the vehicle body VH1. However, the location of the power supply PS is not limited to this embodiment.

Figure 2:
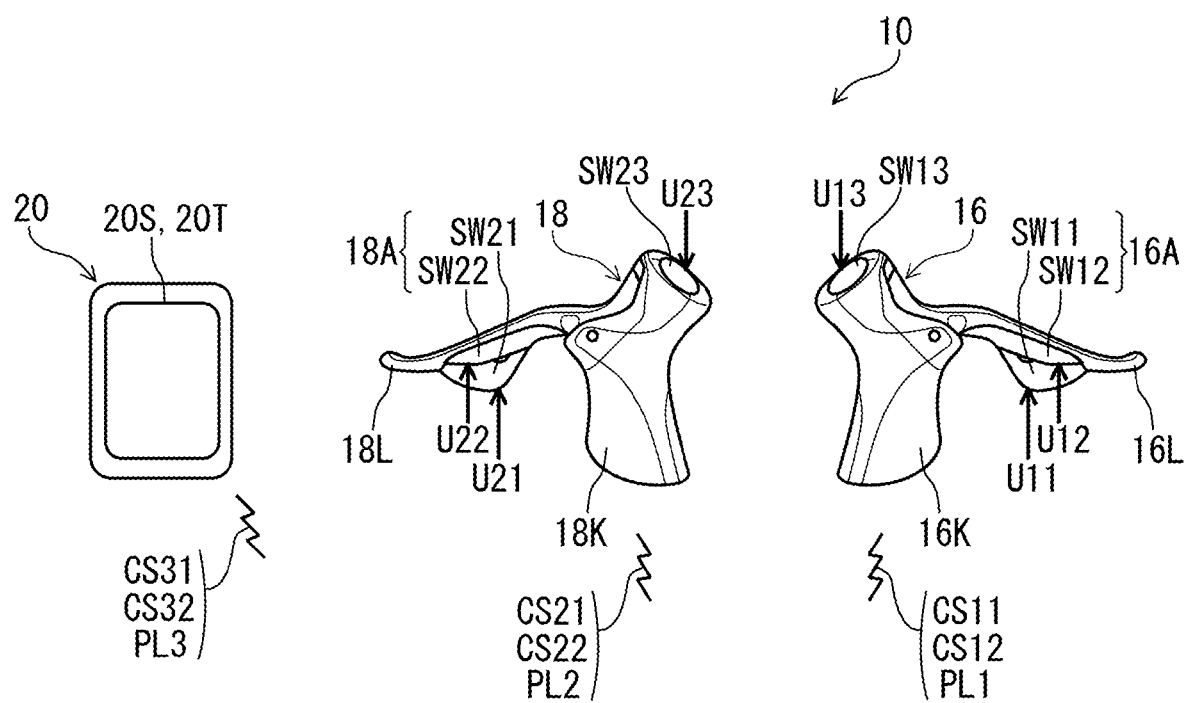
FIG. 2 is a schematic diagram of the operating system of the human-powered vehicle illustrated in FIG. 1.
Figure 2:
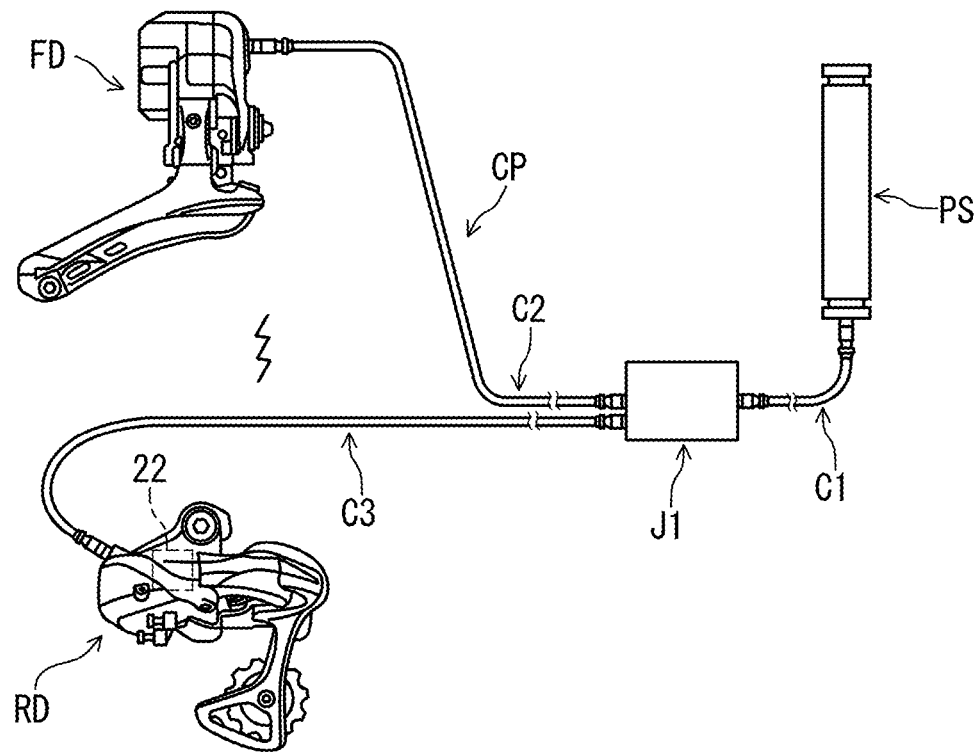

As seen in FIG. 2, the human-powered vehicle VH includes an electric communication path CP. The power supply PS is electrically connected to the electric component RD and the electric component FD with the electric communication path CP to supply electricity to the electric component RD and the electric component FD.

The electric communication path CP includes a junction J1 and electric cables C1 to C3. Each of the electric cables C1 to C3 includes electric connectors at both ends thereof. The junction J1 is electrically connected to the power supply PS with the electric cable C1. The junction J1 is electrically connected to the electric component FD with the electric cable C2. The junction J1 is electrically connected to the electric component RD with the electric cable C3.

The operating system 10 for the human-powered vehicle VH comprises a first operating device 16. The operating system 10 further comprises a second operating device 18. The operating system 10 further comprises an additional electric device 20. Examples of the additional electric device 20 include a smartphone, a tablet computer, and a cycle computer. However, at least one of the additional electric device 20 and the second operating device 18 can be omitted from the operating system 10. The second operating device 18 can also be referred to as an operating device 18. The first operating device 16 can also be referred to as an additional operating device 16.

The first operating device 16 is configured to output a first control signal CS11. The first operating device 16 is configured to receive a first user input U11, a first additional user input U12, and a first additional user input U13. The first operating device 16 is configured to output the first control signal CS11 in response to the first user input U11. The first operating device 16 is configured to output a first additional control signal CS12 in response to the first additional user input U12. The first operating device 16 is configured to output a first additional control signal CS13 in response to the first additional user input U13.

The second operating device 18 is configured to output a second control signal CS21. The second operating device 18 is configured to receive a second user input U21, a second additional user input U22, and a second additional user input U23. The second operating device 18 is configured to output the second control signal CS21 in response to the second user input U21. The second operating device 18 is configured to output a second additional control signal CS22 in response to the second additional user input U22. The second operating device 18 is configured to output a second additional control signal CS23 in response to the second additional user input U23.

Figure 3:
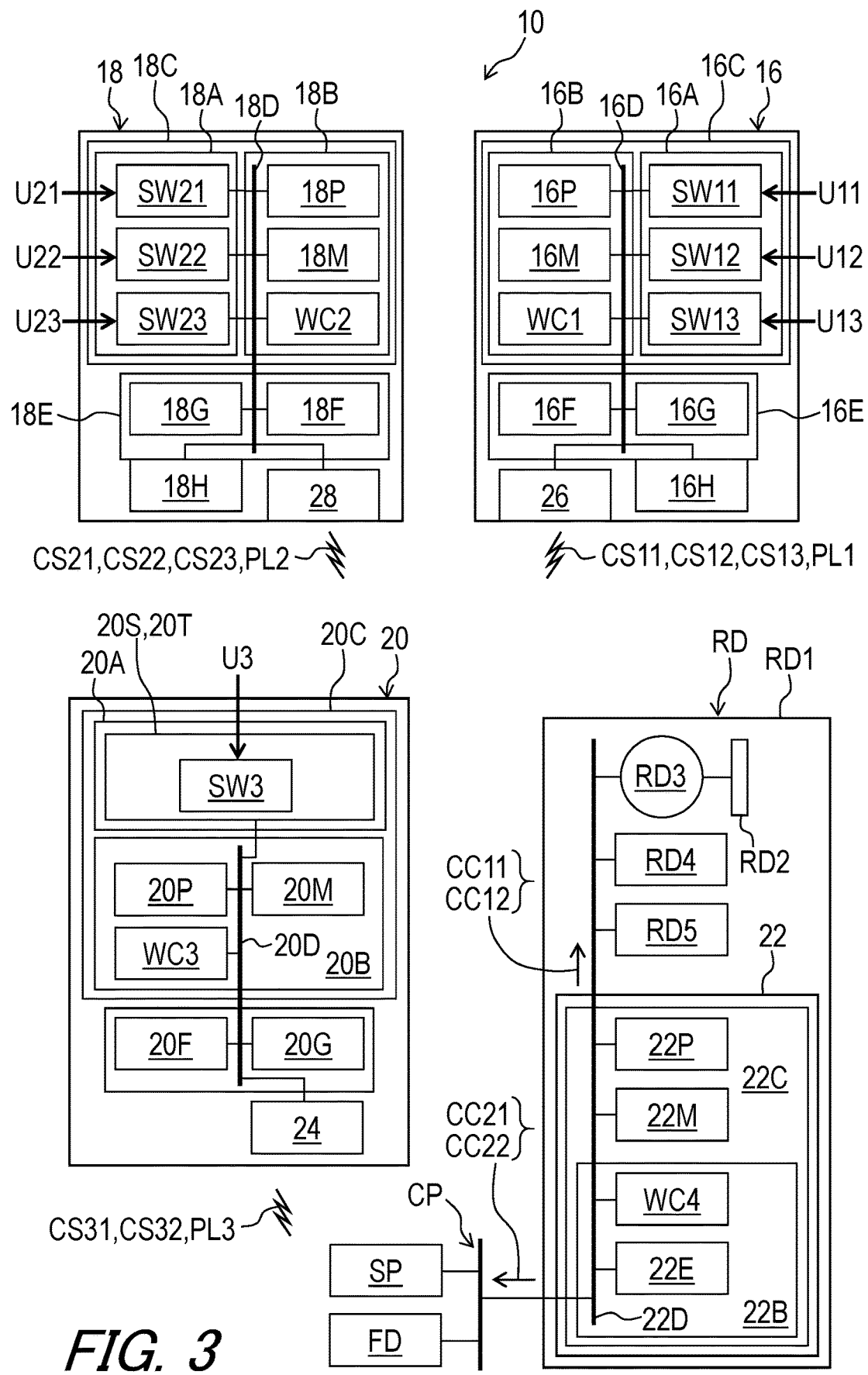
FIG. 3 is a schematic block diagram of the operating system of the human-powered vehicle illustrated in FIG. 1.

As seen in FIG. 3, the first operating device 16 includes a first user interface 16A. The first user interface 16A is configured to receive the first user input U11, the first additional user input U12, and the first additional user input U13. The first user interface 16A includes a first electrical switch SW11. The first electrical switch SW11 is configured to receive the first user input U11. The first user interface 16A includes a first additional electrical switch SW12 and a first additional electrical switch SW13. The first additional electrical switch SW12 is configured to receive the first additional user input U12. The first additional electrical switch SW13 is configured to receive the first additional user input U13.

The first electrical switch SW11 includes a normally open switch. Examples of the first electrical switch SW11 includes a push-button switch and a lever switch. The first additional electrical switch SW12 includes a normally open switch. Examples of the first additional electrical switch SW12 includes a push-button switch and a lever switch. The first additional electrical switch SW13 includes a normally open switch. Examples of the first additional electrical switch SW13 includes a push-button switch and a lever switch. However, the structure of the first user interface 16A is not limited to this embodiment. The first user interface 16A can include another structure such as a touch panel instead of or in additional to the first electrical switch SW11, the first additional electrical switch SW12, and/or the first additional electrical switch SW13.

The first operating device 16 includes a first communicator 16B configured to transmit the first control signal CS11. The first communicator 16B is configured to be electrically connected to the first user interface 16A. The first communicator 16B is configured to be electrically connected to the first electrical switch SW11 to generate and transmit the first control signal CS11 in response to the first user input U11. The first communicator 16B is configured to be electrically connected to the first additional electrical switch SW12 to generate and transmit the first additional control signal CS12 in response to the first additional user input U12. The first communicator 16B is configured to be electrically connected to the first additional electrical switch SW13 to generate and transmit the first additional control signal CS13 in response to the first additional user input U13.

In this embodiment, the first communicator 16B includes a first wireless communicator WC1 configured to wirelessly transmit the first control signal CS11. The first wireless communicator WC1 is configured to wirelessly receive information. The first wireless communicator WC1 is configured to be electrically connected to the first user interface 16A. The first wireless communicator WC1 is configured to be electrically connected to the first electrical switch SW11 to generate and transmit the first control signal CS11 in response to the first user input U11. The first wireless communicator WC1 is configured to be electrically connected to the first additional electrical switch SW12 to generate and transmit the first additional control signal CS12 in response to the first additional user input U12. The first wireless communicator WC1 is configured to be electrically connected to the first additional electrical switch SW13 to generate and transmit the first additional control signal CS13 in response to the first additional user input U13.

The first communicator 16B includes a first processor 16P, a first memory 16M, a first circuit board 16C, and a first system bus 16D. The first processor 16P and the first memory 16M are electrically mounted on the first circuit board 16C. The first processor 16P includes a central processing unit (CPU) and a memory controller. The first memory 16M is electrically connected to the first processor 16P. The first memory 16M includes a read only memory (ROM) and a random-access memory (RAM). The first memory 16M includes storage areas each having an address in the ROM and the RAM. The first processor 16P is configured to control the first memory 16M to store data in the storage areas of the first memory 16M and reads data from the storage areas of the first memory 16M. The first circuit board 16C, the first electrical switch SW11, the first additional electrical switch SW12, and the first additional electrical switch SW13 are electrically connected to the first system bus 16D. The first electrical switch SW11, the first additional electrical switch SW12, and the first additional electrical switch SW13 are electrically connected to the first processor 16P and the first memory 16M with the first circuit board 16C and the first system bus 16D. The first memory 16M (e.g., the ROM) stores a program. The program is read into the first processor 16P, and thereby the configuration and/or algorithm of the first communicator 16B is performed.

The first wireless communicator WC1 is electrically mounted on the first circuit board 16C. The first wireless communicator WC1 is electrically connected to the first processor 16P and the first memory 16M with the first circuit board 16C and the first system bus 16D. The first wireless communicator WC1 includes a signal transmitting circuit, a signal receiving circuit, and an antenna. Thus, the first wireless communicator WC1 can also be referred to as a first wireless communication circuit WC1.

The first wireless communicator WC1 is configured to superimpose digital signals such as the first control signal CS11 and the first additional control signal CS12 on carrier wave using a predetermined wireless communication protocol to wirelessly transmit the first control signal CS11 and the first additional control signal CS12. In this embodiment, the first wireless communicator WC1 is configured to encrypt a control signal (e.g., the first control signal CS11 or the first additional control signal CS12) using a cryptographic key to generate encrypted wireless signals.

The first wireless communicator WC1 is configured to receives a wireless signal via the antenna. In this embodiment, the first wireless communicator WC1 is configured to decode the wireless signal to recognize signals and/or information wirelessly transmitted from another wireless communicator. The first wireless communicator WC1 is configured to decrypt the wireless signal using the cryptographic key.

The first operating device 16 includes a first electric power source 16E. The first electric power source 16E is configured to supply electricity to the first communicator 16B. The first electric power source 16E is configured to be electrically connected to the first communicator 16B. In this embodiment, the first electric power source 16E includes a first battery 16F and a first battery holder 16G. The first battery 16F includes a replaceable and/or rechargeable battery. The first battery holder 16G is configured to be electrically connected to the first communicator 16B via the first circuit board 16C and the first system bus 16D. The first battery 16F is configured to be detachably attached to the first battery holder 16G. However, the first electric power source 16E is not limited to this embodiment. For example, the first electric power source 16E can include another component such as a capacitor and an electricity generation element (e.g., a piezoelectric element) instead of or in addition to the first battery 16F and the first battery holder 16G.

The first operating device 16 includes a first power-level detector 16H configured to detect a first remaining level of the first electric power source 16E. The first power-level detector 16H is configured to be electrically connected to the first electric power source 16E. In this embodiment, the first power-level detector 16H is configured to detect the first remaining level of the first battery 16F of the first electric power source 16E. The first power-level detector 16H is configured to periodically detect the first remaining level of the first battery 16F of the first electric power source 16E. The first power-level detector 16H is configured to generate first power-level information PL1 indicating the first remaining level of the first electric power source 16E. The first memory 16M is configured to store the first power-level information PL1. The first communicator 16B is configured to wirelessly transmit the first power-level information PL1.

As seen in FIG. 2, the first operating device 16 includes a first base member 16K and a first operating member 16L. The first operating member 16L is movably coupled to the first base member 16K. The first electrical switch SW11 and the first additional electrical switch SW12 are mounted to the first operating member 16L. The first additional electrical switch SW13 is mounted to the first base member 16K without the first operating member 16L. However, the locations of the electrical switches SW11, SW12 and SW13 are not limited to this embodiment.

As seen in FIG. 3, the second operating device 18 includes a second user interface 18A. The second user interface 18A is configured to receive the second user input U21, the second additional user input U22, and the second additional user input U23. The second user interface 18A includes a second electrical switch SW21. The second electrical switch SW21 is configured to receive the second user input U21. The second user interface 18A includes a second additional electrical switch SW22 and a second additional electrical switch SW23. The second additional electrical switch SW22 is configured to receive the second additional user input U22. The second additional electrical switch SW23 is configured to receive the second additional user input U23.

The second electrical switch SW21 includes a normally open switch. Examples of the second electrical switch SW21 includes a push-button switch and a lever switch. The second additional electrical switch SW22 includes a normally open switch. Examples of the second additional electrical switch SW22 includes a push-button switch and a lever switch. The second additional electrical switch SW23 includes a normally open switch. Examples of the second additional electrical switch SW23 includes a push-button switch and a lever switch. However, the structure of the second user interface 18A is not limited to this embodiment. The second user interface 18A can include another structure such as a touch panel instead of or in additional to the second electrical switch SW21, the second additional electrical switch SW22, and/or the second additional electrical switch SW23.

The second operating device 18 includes a second communicator 18B configured to transmit the second control signal CS21. The second communicator 18B is configured to be electrically connected to the second user interface 18A. The second communicator 18B is configured to be electrically connected to the second electrical switch SW21 to generate and transmit the second control signal CS21 in response to the second user input U21. The second communicator 18B is configured to be electrically connected to the second additional electrical switch SW22 to generate and transmit the second additional control signal CS22 in response to the second additional user input U22. The second communicator 18B is configured to be electrically connected to the second additional electrical switch SW23 to generate and transmit the second additional control signal CS23 in response to the second additional user input U23.

In this embodiment, the second communicator 18B includes a second wireless communicator WC2 configured to wirelessly transmit the second control signal CS21. The second wireless communicator WC2 is configured to wirelessly receive information. The second wireless communicator WC2 is configured to be electrically connected to the second user interface 18A. The second wireless communicator WC2 is configured to be electrically connected to the second electrical switch SW21 to generate and transmit the second control signal CS21 in response to the second user input U21. The second wireless communicator WC2 is configured to be electrically connected to the second additional electrical switch SW22 to generate and transmit the second additional control signal CS22 in response to the second additional user input U22. The second wireless communicator WC2 is configured to be electrically connected to the second additional electrical switch SW23 to generate and transmit the second additional control signal CS23 in response to the second additional user input U23.

The second communicator 18B includes a second processor 18P, a second memory 18M, a second circuit board 18C, and a second system bus 18D. The second processor 18P and the second memory 18M are electrically mounted on the second circuit board 18C. The second processor 18P includes a CPU and a memory controller. The second memory 18M is electrically connected to the second processor 18P. The second memory 18M includes a ROM and a RAM. The second memory 18M includes storage areas each having an address in the ROM and the RAM. The second processor 18P is configured to control the second memory 18M to store data in the storage areas of the second memory 18M and reads data from the storage areas of the second memory 18M. The second circuit board 18C, the second electrical switch SW21, the second additional electrical switch SW22, and the second additional electrical switch SW23 are electrically connected to the second system bus 18D. The second electrical switch SW21, the second additional electrical switch SW22, and the second additional electrical switch SW23 are electrically connected to the second processor 18P and the second memory 18M with the second circuit board 18C and the second system bus 18D. The second memory 18M (e.g., the ROM) stores a program. The program is read into the second processor 18P, and thereby the configuration and/or algorithm of the second communicator 18B is performed.

The second wireless communicator WC2 is electrically mounted on the second circuit board 18C. The second wireless communicator WC2 is electrically connected to the second processor 18P and the second memory 18M with the second circuit board 18C and the second system bus 18D. The second wireless communicator WC2 includes a signal transmitting circuit, a signal receiving circuit, and an antenna. Thus, the second wireless communicator WC2 can also be referred to as a second wireless communication circuit WC2.

The second wireless communicator WC2 is configured to superimpose digital signals such as the second control signal CS21 and the second additional control signal CS22 on carrier wave using a predetermined wireless communication protocol to wirelessly transmit the second control signal CS21 and the second additional control signal CS22. In this embodiment, the second wireless communicator WC2 is configured to encrypt a control signal (e.g., the second control signal CS21 or the second additional control signal CS22) using a cryptographic key to generate encrypted wireless signals.

The second wireless communicator WC2 is configured to receives a wireless signal via the antenna. In this embodiment, the second wireless communicator WC2 is configured to decode the wireless signal to recognize signals and/or information wirelessly transmitted from another wireless communicator. The second wireless communicator WC2 is configured to decrypt the wireless signal using the cryptographic key.

The second operating device 18 includes a second electric power source 18E. The second electric power source 18E is configured to supply electricity to the second communicator 18B. The second electric power source 18E is configured to be electrically connected to the second communicator 18B. In this embodiment, the second electric power source 18E includes a second battery 18F and a second battery holder 18G. The second battery 18F includes a replaceable and/or rechargeable battery. The second battery holder 18G is configured to be electrically connected to the second communicator 18B via the second circuit board 18C and the second system bus 18D. The second battery 18F is configured to be detachably attached to the second battery holder 18G. However, the second electric power source 18E is not limited to this embodiment. For example, the second electric power source 18E can include another component such as a capacitor and an electricity generation element (e.g., a piezoelectric element) instead of or in addition to the second battery 18F and the second battery holder 18G.

The second operating device 18 includes a second power-level detector 18H configured to detect the second remaining level of the second electric power source 18E. The second power-level detector 18H is configured to be electrically connected to the second electric power source 18E. In this embodiment, the second power-level detector 18H is configured to detect the second remaining level of the second battery 18F of the second electric power source 18E. The second power-level detector 18H is configured to periodically detect the second remaining level of the second battery 18F of the second electric power source 18E. The second power-level detector 18H is configured to generate second power-level information PL2 indicating the second remaining level of the second electric power source 18E. The second memory 18M is configured to store the second power-level information PL2. The second communicator 18B is configured to wirelessly transmit the second power-level information PL2.

As seen in FIG. 2, the second operating device 18 includes a second base member 18K and a second operating member 18L. The second operating member 18L is movably coupled to the second base member 18K. The second electrical switch SW21 and the second additional electrical switch SW22 are mounted to the second operating member 18L. The second additional electrical switch SW23 is mounted to the second base member 18K without the second operating member 18L. However, the locations of the electrical switches SW21, SW22 and SW23 are not limited to this embodiment. The second base member 18K can also be referred to as a base member 18K. The second operating member 18L can also be referred to as an operating member 18L. The first base member 16K can also be referred to as an additional base member 16K. The first operating member 16L can also be referred to as an additional operating member 16L.

As seen in FIG. 3, the additional electric device 20 includes an additional user interface 20A. The additional user interface 20A is configured to receive an additional user input U3. In this embodiment, the additional user interface 20A includes a display 20S. The additional user interface 20A includes a touch panel 20T. The display 20S is configured to display information relating to the human-powered vehicle VH. The touch panel 20T is mounted to the display 20S. However, the structure of the additional user interface 20A is not limited to this embodiment. The additional user interface 20A can include another structure such as an electrical switch.

The additional electric device 20 includes an additional communicator 20B. The additional communicator 20B is configured to transmit an additional control signal CS31. The additional communicator 20B is configured to receive vehicle information CS32 relating to the human-powered vehicle VH. The additional communicator 20B is configured to be electrically connected to the additional user interface 20A. The additional communicator 20B is configured to be electrically connected to the touch panel 20T to generate and transmit the additional control signal CS31 in response to the additional user input U3. For example, the additional control signal CS31 includes a command to control another component.

In this embodiment, the additional user interface 20A includes a virtual switch SW3 configured to receive the additional user input U3. The display 20S is configured to display the virtual switch SW3. The touch panel 20T is configured to detect that the user touches the virtual switch SW3. The additional communicator 20B is configured to generate and output the additional control signal CS31 in response to the additional user input U3 received by the virtual switch SW3.

In this embodiment, the additional communicator 20B includes an additional wireless communicator WC3. The additional wireless communicator WC3 is configured to wirelessly transmit the additional control signal CS31. The additional wireless communicator WC3 is configured to wirelessly receive the vehicle information CS32. The additional wireless communicator WC3 is configured to be electrically connected to the additional user interface 20A. The additional wireless communicator WC3 is configured to be electrically connected to the touch panel 20T to generate and transmit the additional control signal CS31 in response to the additional user input U3.

The additional communicator 20B includes a processor 20P, a memory 20M, a circuit board 20C, and a system bus 20D. The processor 20P and the memory 20M are electrically mounted on the circuit board 20C. The processor 20P includes a CPU and a memory controller. The memory 20M is electrically connected to the processor 20P. The memory 20M includes a ROM and a RAM. The memory 20M includes storage areas each having an address in the ROM and the RAM. The processor 20P is configured to control the memory 20M to store data in the storage areas of the memory 20M and reads data from the storage areas of the memory 20M. The circuit board 20C and the touch panel 20T are electrically connected to the system bus 20D. The touch panel 20T is electrically connected to the processor 20P and the memory 20M with the circuit board 20C and the system bus 20D. The memory 20M (e.g., the ROM) stores a program. The program is read into the processor 20P, and thereby the configuration and/or algorithm of the additional communicator 20B is performed.

The additional wireless communicator WC3 is electrically mounted on the circuit board 20C. The additional wireless communicator WC3 is electrically connected to the processor 20P and the memory 20M with the circuit board 20C and the system bus 20D. The additional wireless communicator WC3 includes a signal transmitting circuit, a signal receiving circuit, and an antenna. Thus, the additional wireless communicator WC3 can also be referred to as an additional wireless communication circuit WC3.

The additional wireless communicator WC3 is configured to superimpose digital signals such as the additional control signal CS31 on carrier wave using a predetermined wireless communication protocol to wirelessly transmit the additional control signal CS31. In this embodiment, the additional wireless communicator WC3 is configured to encrypt a control signal (e.g., the additional control signal CS31) using a cryptographic key to generate encrypted wireless signals.

The additional wireless communicator WC3 is configured to receives a wireless signal via the antenna. In this embodiment, the additional wireless communicator WC3 is configured to decode the wireless signal to recognize signals and/or information (e.g., the vehicle information CS32) wirelessly transmitted from another wireless communicator. The additional wireless communicator WC3 is configured to decrypt the wireless signal using the cryptographic key.

The additional electric device 20 includes an electric power source 20E. The electric power source 20E is configured to supply electricity to the additional communicator 20B. The electric power source 20E is configured to be electrically connected to the additional communicator 20B. In this embodiment, the electric power source 20E includes a battery 20F and a battery holder 20G. The battery 20F includes a replaceable and/or rechargeable battery. The battery holder 20G is configured to be electrically connected to the additional communicator 20B via the circuit board 20C and the system bus 20D. The battery 20F is configured to be detachably attached to the battery holder 20G. However, the electric power source 20E is not limited to this embodiment. For example, the electric power source 20E can include another component such as a capacitor and an electricity generation element (e.g., a piezoelectric element) instead of or in addition to the battery 20F and the battery holder 20G.

The additional electric device 20 includes a power-level detector 20H configured to detect the remaining level of the electric power source 20E. The power-level detector 20H is configured to be electrically connected to the electric power source 20E. In this embodiment, the power-level detector 20H is configured to detect the remaining level of the battery 20F of the electric power source 20E. The power-level detector 20H is configured to periodically detect the remaining level of the battery 20F of the electric power source 20E. The power-level detector 20H is configured to generate power-level information PL3 indicating the remaining level of the electric power source 20E. The memory 20M is configured to store the power-level information PL3. The additional communicator 20B is configured to wirelessly transmit the power-level information PL3.

As seen in FIG. 3, the operating system 10 for the human-powered vehicle comprises a controller 22. The controller 22 is configured to be communicate with the first operating device 16, the second operating device 18, and the additional electric device 20. In this embodiment, the controller 22 is configured to be mounted to the electric component RD. However, the controller 22 can be mounted to another device such as the first operating device 16, the second operating device 18, the additional electric device 20, the electric component FD, the power supply PS, and the junction J1.

The controller 22 includes a processor 22P, a memory 22M, a circuit board 22C, and a system bus 22D. The processor 22P and the memory 22M are electrically mounted on the circuit board 22C. The processor 22P includes a CPU and a memory controller. The memory 22M is electrically connected to the processor 22P. The memory 22M includes a ROM and a RAM. The memory 22M includes storage areas each having an address in the ROM and the RAM. The processor 22P is configured to control the memory 22M to store data in the storage areas of the memory 22M and reads data from the storage areas of the memory 22M. The memory 22M (e.g., the ROM) stores a program. The program is read into the processor 22P, and thereby the configuration and/or algorithm of the communicator 22B is performed.

The controller 22 includes a communicator 22B. The communicator 22B is configured to communicate with the first communicator 16B. The communicator 22B is configured to communicate with the second communicator 18B. The communicator 22B is configured to communicate with the additional communicator 20B.

In this embodiment, the controller 22 is configured to receive the first control signal CS11 and the first additional control signal CS12 from the first operating device 16. The controller 22 is configured to receive the first power-level information PL1 indicating the first remaining level of the first electric power source 16E from the first operating device 16. The controller 22 is configured to receive the first power-level information PL1 based on the first remaining level detected by the first power-level detector 16H.

The controller 22 is configured to receive the second control signal CS21 and the second additional control signal CS22 from the second operating device 18. The controller 22 is configured to receive the second power-level information PL2 indicating the second remaining level of the electric power source 20E from the second operating device 18. The controller 22 is configured to receive the second power-level information PL2 based on the second remaining level detected by the second power-level detector 18H.

The controller 22 is configured to receive the additional control signal CS31 from the additional electric device 20 and the power-level information PL3. The controller 22 is configured to transmit the vehicle information CS32 to the additional electric device 20.

The controller 22 is configured to receive first communication-state information CL1 indicating a communication state between the communicator 22B of the controller 22 and the first communicator 16B of the first operating device 16. The controller 22 is configured to determine whether the first operating device 16 meets the first predetermined condition based on the first communication-state information CL1. In this embodiment, the first communication-state information CL1 includes signal strength of radio waves transmitted from the first operating device 16. However, the first communication-state information CL1 can include other information such as an acknowledge signal from the first operating device 16.

The controller 22 is configured to receive second communication-state information CL2 indicating a communication state between the communicator 22B of the controller 22 and the second communicator 18B of the second operating device 18. The controller 22 is configured to determine whether the second operating device 18 meets the second predetermined condition based on the second communication-state information CL2. In this embodiment, the second communication-state information CL2 includes signal strength of radio waves transmitted from the second operating device 18. However, the second communication-state information CL2 can include other information such as an acknowledge signal from the second operating device 18.

In this embodiment, the communicator 22B includes a wireless communicator WC4 configured to wirelessly receive the first control signal CS11, the first additional control signal CS12, the second control signal CS21, the second additional control signal CS22, the additional control signal CS31, the first power-level information PL1, the second power-level information PL2, and the power-level information PL3. The wireless communicator WC4 is configured to wirelessly transmit signals or other information such as the vehicle information CS32.

The wireless communicator WC4 is electrically mounted on the circuit board 22C. The wireless communicator WC4 is electrically connected to the processor 22P and the memory 22M with the circuit board 22C and the system bus 22D. The wireless communicator WC4 includes a signal transmitting circuit, a signal receiving circuit, and an antenna. Thus, the wireless communicator WC4 can also be referred to as a wireless communication circuit WC4.

The wireless communicator WC4 is configured to superimpose digital signals such as the vehicle information CS32 on carrier wave using a predetermined wireless communication protocol to wirelessly transmit the vehicle information CS32. In this embodiment, the wireless communicator WC4 is configured to encrypt a control signal (e.g., the vehicle information CS32) using a cryptographic key to generate encrypted wireless signals.

The wireless communicator WC4 is configured to receives a wireless signal via the antenna. In this embodiment, the wireless communicator WC4 is configured to decode the wireless signal to recognize the first control signal CS11, the first additional control signals CS12 and CS13, the second control signal CS21, the second additional control signals CS22 and CS23, the additional control signal CS31, the first power-level information PL1, the second power-level information PL2, and/or the power-level information PL3 which are wirelessly transmitted from the first wireless communicator WC1, the second wireless communicator WC2, and/or the additional wireless communicator WC3. The wireless communicator WC4 is configured to decrypt the wireless signal using the cryptographic key.

The controller 22 is configured to generate a first control command CC11 based on the first control signal CS11. The controller 22 is configured to generate a first additional control command CC12 based on the first additional control signal CS12. The controller 22 is configured to generate a second control command CC21 based on the second control signal CS21. The controller 22 is configured to generate a second additional control command CC22 based on the second additional control signal CS22.

The first control signal CS11, the first additional control signals CS12 and CS13, the second control signal CS21, and the second additional control signals CS22 and CS23 are different from each other. The first control command CC11, the first additional control command CC12, the second control command CC21, and the second additional control command CC22 are different from each other.

In this embodiment, the first control signal CS11 and the first control command CC11 indicate upshifting of the electric component RD. The first additional control signal CS12 and the first additional control command CC12 indicate downshifting of the electric component RD. The first additional control signal CS13 can indicate the upshifting, the downshifting, or another command to operate another electric component such as the additional electric device 20, an assist driving unit, an adjustable seatpost, an internal gear hub, a front suspension, a rear suspension, or a light emitting device. The second control signal CS21 and the second control command CC21 indicate upshifting of the electric component FD. The second additional control signal CS22 and the second additional control command CC22 indicate downshifting of the electric component FD. The second additional control signal CS23 can indicate the upshifting, the downshifting, or another command to operate another electric component such as the additional electric device 20, an assist driving unit, an adjustable seatpost, an internal gear hub, a front suspension, a rear suspension, or alight emitting device. The control signals CS11, CS12, CS21 and CS22 and the control commands CC11, CC12, CC21 and CC22 can indicate other commands to operate other devices such as an assist driving unit, an adjustable seatpost, an internal gear hub, a front suspension, a rear suspension, and a light emitting device.

As seen in FIG. 3, the electric component RD includes a base member RD1, a chain guide RD2, an actuator RD3, a position sensor RD4, and an actuator driver RD5. The base member RD1 is mounted to the vehicle body VH1 (see e.g., FIG. 1). The chain guide RD2 is movably coupled to the base member RD1 and is configured to engage with the chain C. The actuator RD3 is configured to move the chain guide RD2 relative to the base member RD1 to shift the chain C relative to the rear sprocket assembly RS. Examples of the actuator RD3 include a direct current motor and a stepper motor.

The actuator driver RD5 is electrically connected to the actuator RD3 to control the actuator RD3 based on the first control command CC11 and the first additional control command CC12 generated by the controller 22. Examples of the actuator RD3 include a direct-current (DC) motor and a stepper motor. The actuator RD3 includes a rotational shaft operatively coupled to the chain guide RD2. The position sensor RD4 is configured to sense a current gear position of the electric component RD. Examples of the position sensor RD4 include a potentiometer and a rotary encoder. The position sensor RD4 is configured to sense an absolute rotational position of the rotational shaft of the actuator RD3 as the current gear position of the electric component RD. The actuator RD3 and the position sensor RD4 are electrically connected to the actuator driver RD5.

The actuator driver RD5 is configured to control the actuator RD3 to move the chain guide RD2 relative to the base member RD1 by one gear position in an upshift direction based on the first control command CC11 and the current gear position sensed by the position sensor RD4. The actuator driver RD5 is configured to control the actuator RD3 to move the chain guide RD2 relative to the base member RD1 by one gear position in a downshift direction based on the first additional control command CC12 and the current gear position sensed by the position sensor RD4.

The electric component FD has substantially the same structure as the structure of the electric component RD. Thus, it will not be described in detail here for the sake of brevity.

As seen in FIG. 2, the electric components RD and FD communicate with each other via the electric communication path CP using power line communication (PLC) technology. More specifically, each of the electric cables C1 to C3 includes a ground line and a voltage line that are detachably connected to a serial bus that is formed by communication interfaces and the junction J1. In this embodiment, the electric component RD, the electric component FD, and the power supply PS can all communicate with each other through the voltage line using the PLC technology.

As seen in FIG. 3, the second control command CC21 and the second additional control command CC22 are transmitted from the controller 22 to the electric component FD through the electric communication path CP. However, the electric component FD can include a wireless communicator configured to wirelessly receive the second control signal CS21 and the second additional control signal CS22. In such embodiment, the power supply PS, the electric cables C1 to C3, and the junction J1 can be omitted from the operating system 10. Instead, each of the electric components RD and FD can include a power supply.

The PLC technology is used for communicating between electric components. The PLC carries data on a conductor that is also used simultaneously for electric power transmission or electric power distribution to the electric components. In this embodiment, electricity is supplied from the power supply PS to the electric component RD, and the electric component FD via the electric communication path CP. Furthermore, the controller 22 can receive information signals from the electric component RD, the electric component FD, and the power supply PS through the electric communication path CP using the PLC.

The PLC uses unique identifying information such as a unique identifier that is assigned to each of the electric component RD, the electric component FD, and the power supply PS. Each of the electric components RD, FD, and PS includes a memory in which the unique identifying information is stored. Based on the unique identifying information, each of the electric components RD, FD, and PS is configured to recognize, based on the unique identifying information, information signals which are necessary for itself among information signals transmitted via the electric communication path CP. For example, the controller 22 is configured to recognize information signals transmitted from the electric component RD, the electric component FD, and the power supply PS with the electric communication path CP. Instead of using the PLC technology, however, separate signal wires can be provided for transmitting data in addition to the ground wire and the voltage wire if needed and/or desired.

The communicator 22B includes a PLC controller 22E. The PLC controller 22E is connected to the electric communication path CP, the electric component RD, and the system bus 22D. The PLC controller PC is configured to separate input signals to a power source voltage and control signals. The PLC controller 22E is configured to regulate the power source voltage to a level at which the controller 22 and the electric component RD can properly operate. The PLC controller 22E is further configured to superimpose output signals such as the second control command CC21 and the second additional control command CC22 on the power source voltage applied to the electric communication path CP from the power supply PS.

Each of the electric component FD and the power supply PS includes a PLC controller having substantially the same structure as the structure of the PLC controller 22E. Thus, they will not be described in detail here for the sake of brevity.

As seen in FIG. 3, the controller 22 is configured to determine whether the first operating device 16 meets a first predetermined condition. In this embodiment, the first predetermined condition includes a first backup condition in which the first operating device 16 needs a backup device configured to receive the first user input U11 instead of or in addition to the first operating device 16. The first backup condition includes a condition in which the first operating device 16 needs a backup device configured to receive the first user input U11 and the first additional user input U12 instead of or in addition to the first operating device 16. In this embodiment, the additional electric device 20 has the configuration of the backup device. However, the first predetermined condition is not limited to such backup condition. Furthermore, other devices such as the second operating device 18 can be such backup device.

The controller 22 is configured to determine whether the first operating device 16 meets the first predetermined condition based on the first power-level information PL1. The controller 22 is configured to determine whether the first operating device 16 meets the first predetermined condition based on a first power-level condition in which the first remaining level of the first electric power source 16E is equal to or lower than a first threshold TH11. The controller 22 is configured to store the first threshold TH11 in the memory 22M. The controller 22 is configured to conclude that the first operating device 16 meets the first predetermined condition if the first remaining level of the first electric power source 16E is equal to or lower than the first threshold TH11. The controller 22 is configured to conclude that the first operating device 16 does not meet the first predetermined condition if the first remaining level of the first electric power source 16E is higher than the first threshold TH11.

Furthermore, the controller 22 is configured to determine whether the first operating device 16 meets the first predetermined condition based on the first communication-state information CL1. The controller 22 is configured to conclude that the first operating device 16 meets the first predetermined condition if the first communication-state information CL1 is equal to or lower than a first communication-state threshold TH12. In this embodiment, the controller 22 is configured to conclude that the first operating device 16 meets the first predetermined condition if the signal strength of the radio waves transmitted from the first operating device 16 is equal to or lower than the first communication-state threshold TH12. The controller 22 is configured to store the first communication-state threshold TH12 in the memory 22M. The controller 22 is configured to conclude that the first operating device 16 do not meet the first predetermined condition if the signal strength of the radio waves transmitted from the first operating device 16 is higher than the first communication-state threshold TH12.

Figure 4:
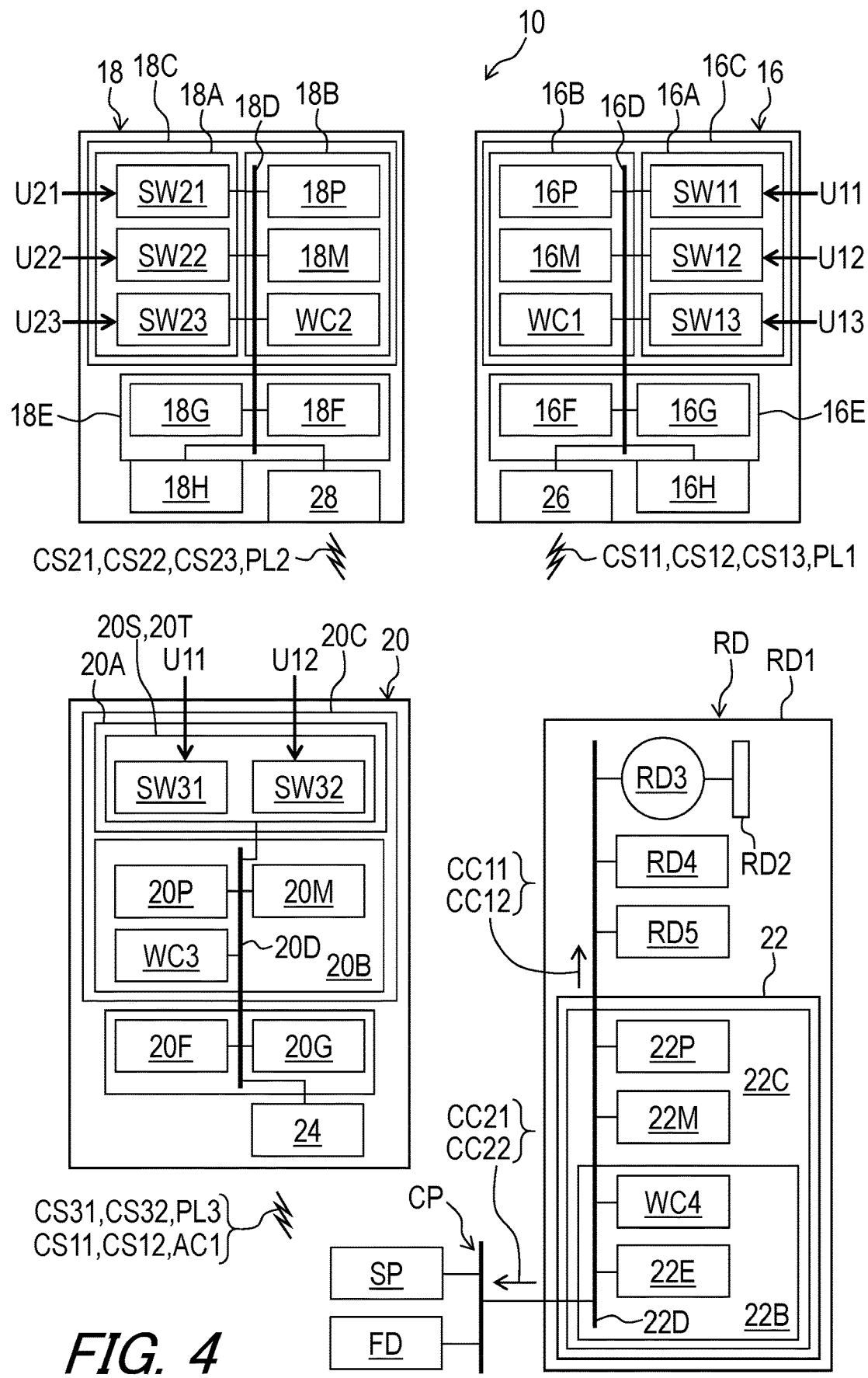
FIG. 4 is a schematic block diagram of the operating system of the human-powered vehicle illustrated in FIG. 1.

As seen in FIG. 4, the controller 22 is configured to assign, if the first operating device 16 meets the first predetermined condition, the additional electric device 20 a function of the first operating device 16 so that the additional electric device 20 outputs the first control signal CS11. In this embodiment, the controller 22 is configured to assign, if the first remaining level of the first electric power source 16E is equal to or lower than the first threshold TH11, the additional electric device 20 the function of the first operating device 16 so that the additional electric device 20 outputs the first control signal CS11. The controller 22 is configured to assign, if the signal strength of the radio waves transmitted from the first operating device 16 is equal to or lower than the first communication-state threshold TH12, the additional electric device 20 the function of the first operating device 16 so that the additional electric device 20 outputs the first control signal CS11.

The controller 22 is configured to assign, if the first operating device 16 meets the first predetermined condition, the additional electric device 20 the function of the first operating device 16 so that the additional electric device 20 outputs the first additional control signal CS12. In this embodiment, the controller 22 is configured to assign, if the first remaining level of the first electric power source 16E is equal to or lower than the first threshold TH11, the additional electric device 20 the function of the first operating device 16 so that the additional electric device 20 outputs the first additional control signal CS12. The controller 22 is configured to assign, if the signal strength of the radio waves transmitted from the first operating device 16 is equal to or lower than the first communication-state threshold TH12, the additional electric device 20 the function of the first operating device 16 so that the additional electric device 20 outputs the first additional control signal CS12.

As seen in FIG. 4, the controller 22 is configured to assign, if the first operating device 16 meets the first predetermined condition, the additional user interface 20A the function of the first user interface 16A. In this embodiment, if the first operating device 16 meets the first predetermined condition, the controller 22 is configured to transmit, to the additional electric device 20, an assignment command AC1 indicating that the function of the first operating device 16 is assigned to the additional electric device 20.

The additional communicator 20B is configured to transmit the first control signal CS11 if the controller 22 assigns the additional electric device 20 the function of the first operating device 16. The additional electric device 20 is configured to assign the additional user interface 20A the function of the first user interface 16A in response to the assignment command AC1. The additional electric device 20 is configured to store the function of the first operating device 16 in the memory 20M. The additional electric device 20 is configured to store the function of the first user interface 16A of the first operating device 16 in the memory 20M. The function of the first operating device 16 is associated with the assignment command AC1. The function of the first user interface 16A of the first operating device 16 is associated with the assignment command AC1.

The additional user interface 20A includes a virtual switch SW31 displayed on the display 20S. The controller 22 is configured to assign, if the first operating device 16 meets the first predetermined condition, the virtual switch SW31 the function of the first electrical switch SW11. The additional communicator 20B is configured to create the virtual switch SW31 on the display 20S and assign the virtual switch SW31 the function of the first electrical switch SW11 in response to the assignment command AC1. The virtual switch SW31 is configured to receive the first user input U11 instead of or in addition to the first operating device 16. The touch panel 20T is configured to detect that the user touches the virtual switch SW31. The additional communicator 20B is configured to generate and output the first control signal CS11 in response to the first user input U11 received by the virtual switch SW31.

The additional communicator 20B is configured to transmit the first control signal CS11 in response to the first user input U11 received by the virtual switch SW31 after the function of the first operating device 16 is assigned to the additional electric device 20. The additional wireless communicator WC3 is configured to wirelessly transmit the first control signal CS11 if the controller 22 assigns the additional electric device 20 the function of the first operating device 16. The additional wireless communicator WC3 is configured to wirelessly transmit the first control signal CS11 in response to the first user input U11 received by the virtual switch SW31 if the controller 22 assigns the additional electric device 20 the function of the first operating device 16.

The additional user interface 20A includes a virtual switch SW32 displayed on the display 20S. The controller 22 is configured to assign, if the first operating device 16 meets the first predetermined condition, the virtual switch SW32 the function of the first additional electrical switch SW12. The additional communicator 20B is configured to create the virtual switch SW32 on the display 20S and assign the virtual switch SW32 the function of the first additional electrical switch SW12 in response to the assignment command AC1. The virtual switch SW32 is configured to receive the first additional user input U12 instead of or in addition to the first operating device 16. The touch panel 20T is configured to detect that the user touches the virtual switch SW32. The additional communicator 20B is configured to generate and output the first additional control signal CS12 in response to the first additional user input U12 received by the virtual switch SW32.

The additional communicator 20B is configured to transmit the first additional control signal CS12 in response to the first additional user input U12 received by the virtual switch SW32 after the function of the first operating device 16 is assigned to the additional electric device 20. The additional wireless communicator WC3 is configured to wirelessly transmit the first additional control signal CS12 if the controller 22 assigns the additional electric device 20 the function of the first operating device 16. The additional wireless communicator WC3 is configured to wirelessly transmit the first additional control signal CS12 in response to the first additional user input U12 received by the virtual switch SW32 if the controller 22 assigns the additional electric device 20 the function of the first operating device 16.

Figure 5:
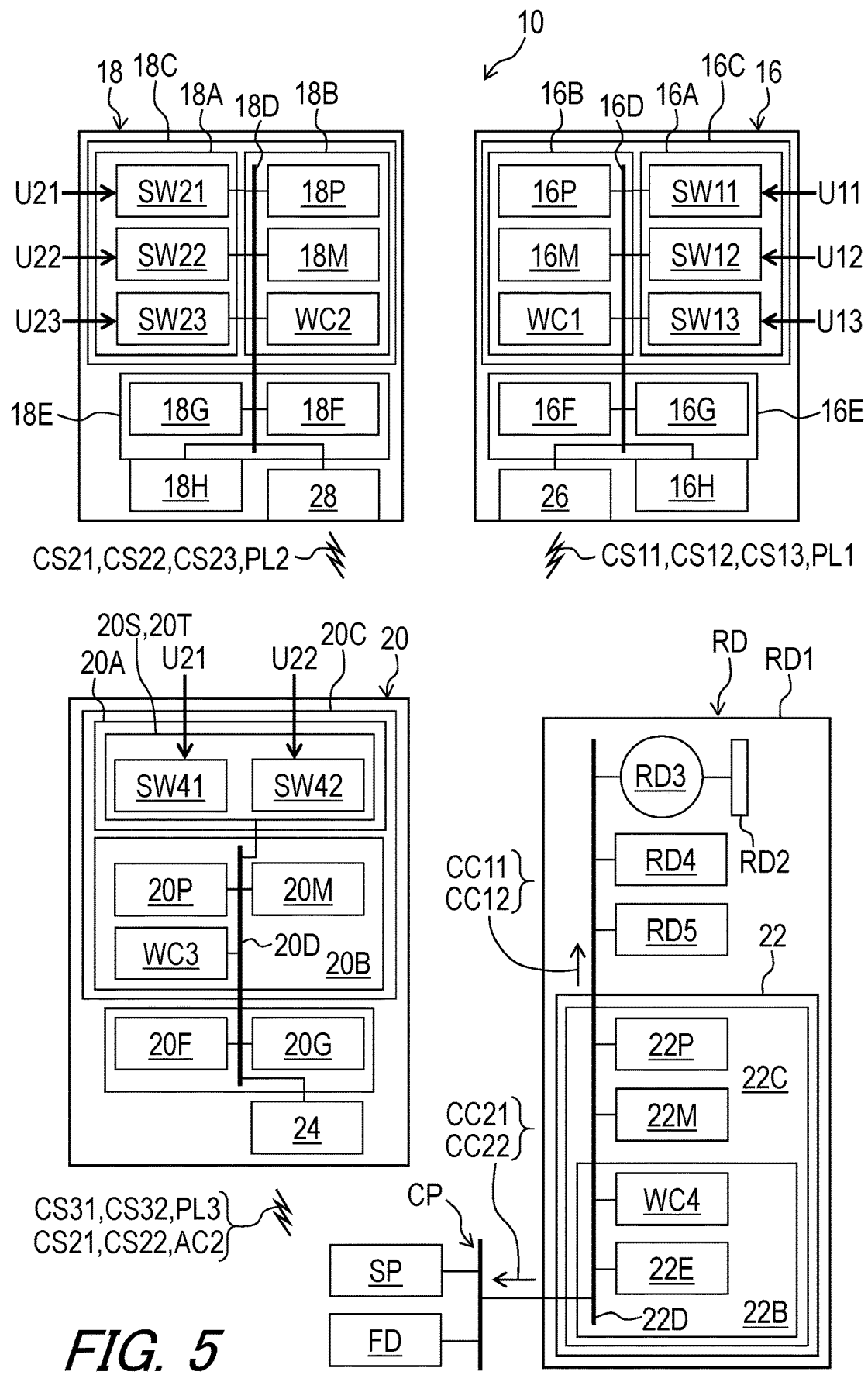
FIG. 5 is a schematic block diagram of the operating system of the human-powered vehicle illustrated in FIG. 1.

As seen in FIG. 5, the controller 22 is configured to determine whether the second operating device 18 meets a second predetermined condition. In this embodiment, the second predetermined condition includes a second backup condition in which the second operating device 18 needs a backup device configured to receive the second user input U21 instead of or in addition to the second operating device 18. The second backup condition includes a condition in which the second operating device 18 needs a backup device configured to receive the second user input U21 and the second additional user input U22 instead of or in addition to the second operating device 18. In this embodiment, the additional electric device 20 has the configuration of the backup device. However, the second predetermined condition is not limited to such backup condition. Furthermore, other devices such as the first operating device 16 can be such backup device.

The controller 22 is configured to determine whether the second operating device 18 meets the second predetermined condition based on the second power-level information PL2. The controller 22 is configured to determine whether the second operating device 18 meets the second predetermined condition in which a second remaining level of the second electric power source 18E is equal to or lower than a second threshold TH21. The controller 22 is configured to store the second threshold TH21 in the memory 22M. The controller 22 is configured to conclude that the second operating device 18 meets the second predetermined condition if the second remaining level of the second electric power source 18E is equal to or lower than the second threshold TH21. The controller 22 is configured to conclude that the second operating device 18 does not meet the second predetermined condition if the second remaining level of the second electric power source 18E is higher than the second threshold TH21.

Furthermore, the controller 22 is configured to determine whether the second operating device 18 meets the second predetermined condition based on the second communication-state information CL2. The controller 22 is configured to conclude that the second operating device 18 meets the second predetermined condition if the second communication-state information CL2 is equal to or lower than a second communication-state threshold TH22. In this embodiment, the controller 22 is configured to conclude that the second operating device 18 meets the second predetermined condition if the signal strength of the radio waves transmitted from the second operating device 18 is equal to or lower than a second communication-state threshold TH22. The controller 22 is configured to store the second communication-state threshold TH22 in the memory 22M. The controller 22 is configured to conclude that the second operating device 18 do not meet the second predetermined condition if the signal strength of the radio waves transmitted from the second operating device 18 is higher than the second communication-state threshold TH22.

The controller 22 is configured to assign, if the second operating device 18 meets the second predetermined condition, the additional electric device 20 a function of the second operating device 18 so that the additional electric device 20 outputs the second control signal CS21. In this embodiment, the controller 22 is configured to assign, if the second remaining level of the second electric power source 18E is equal to or lower than the second threshold TH21, the additional electric device 20 the function of the second operating device 18 so that the additional electric device 20 outputs the second control signal CS21. The controller 22 is configured to assign, if the signal strength of the radio waves transmitted from the second operating device 18 is equal to or lower than the second communication-state threshold TH22, the additional electric device 20 the function of the second operating device 18 so that the additional electric device 20 outputs the second control signal CS21.

The controller 22 is configured to assign, if the second operating device 18 meets the second predetermined condition, the additional electric device 20 the function of the second operating device 18 so that the additional electric device 20 outputs the second additional control signal CS22. The controller 22 is configured to assign, if the second remaining level of the second electric power source 18E is equal to or lower than the second threshold TH21, the additional electric device 20 the function of the second operating device 18 so that the additional electric device 20 outputs the second additional control signal CS22. The controller 22 is configured to assign, if the signal strength of the radio waves transmitted from the second operating device 18 is equal to or lower than the second communication-state threshold TH22, the additional electric device 20 the function of the second operating device 18 so that the additional electric device 20 outputs the second additional control signal CS22.

As seen in FIG. 5, the controller 22 is configured to assign, if the second operating device 18 meets the second predetermined condition, the additional user interface 20A the function of the second user interface 18A. In this embodiment, if the second operating device 18 meets the second predetermined condition, the controller 22 is configured to transmit, to the additional electric device 20, an assignment command AC2 indicating that the function of the second operating device 18 is assigned to the additional electric device 20.

The additional communicator 20B is configured to transmit the second control signal CS21 if the controller 22 assigns the additional electric device 20 the function of the second operating device 18. The additional electric device 20 is configured to assign the additional user interface 20A the function of the second user interface 18A in response to the assignment command AC2. The additional electric device 20 is configured to store the function of the second operating device 18 in the memory 20M. The additional electric device 20 is configured to store the function of the second user interface 18A of the second operating device 18 in the memory 20M. The function of the second operating device 18 is associated with the assignment command AC1. The function of the second user interface 18A of the second operating device 18 is associated with the assignment command AC2.

The additional user interface 20A includes a virtual switch SW41 displayed on the display 20S. The controller 22 is configured to assign, if the second operating device 18 meets the second predetermined condition, the virtual switch SW41 the function of the second electrical switch SW21. The additional communicator 20B is configured to create the virtual switch SW41 on the display 20S and assign the virtual switch SW41 the function of the second electrical switch SW21 in response to the assignment command AC2. The virtual switch SW41 is configured to receive the second user input U21 instead of or in addition to the second operating device 18. The touch panel 20T is configured to detect that the user touches the virtual switch SW41. The additional communicator 20B is configured to generate and output the second control signal CS21 in response to the second user input U21 received by the virtual switch SW41.

The additional communicator 20B is configured to transmit the second control signal CS21 in response to the second user input U21 received by the virtual switch SW41 after the function of the second operating device 18 is assigned to the additional electric device 20. The additional wireless communicator WC3 is configured to wirelessly transmit the second control signal CS21 if the controller 22 assigns the additional electric device 20 the function of the second operating device 18. The additional wireless communicator WC3 is configured to wirelessly transmit the second control signal CS21 in response to the second user input U21 received by the virtual switch SW41 if the controller 22 assigns the additional electric device 20 the function of the second operating device 18.

The additional user interface 20A includes a virtual switch SW42 displayed on the display 20S. The controller 22 is configured to assign, if the second operating device 18 meets the second predetermined condition, the virtual switch SW42 the function of the second additional electrical switch SW22. The additional communicator 20B is configured to create the virtual switch SW42 on the display 20S and assign the virtual switch SW42 the function of the second additional electrical switch SW22 in response to the assignment command AC2. The virtual switch SW42 is configured to receive the second additional user input U22 instead of or in addition to the second operating device 18. The touch panel 20T is configured to detect that the user touches the virtual switch SW42. The additional communicator 20B is configured to generate and output the second additional control signal CS22 in response to the second additional user input U22 received by the virtual switch SW42.

The additional communicator 20B is configured to transmit the second additional control signal CS22 in response to the second additional user input U22 received by the virtual switch SW42 after the function of the second operating device 18 is assigned to the additional electric device 20. The additional wireless communicator WC3 is configured to wirelessly transmit the second additional control signal CS22 if the controller 22 assigns the additional electric device 20 the function of the second operating device 18. The additional wireless communicator WC3 is configured to wirelessly transmit the second additional control signal CS22 in response to the second additional user input U22 received by the virtual switch SW42 if the controller 22 assigns the additional electric device 20 the function of the second operating device 18.

As seen in FIGS. 4 and 5, the operating system 10 further comprises a notification device 24. The notification device 24 is configured to notify a user that the first operating device 16 meets the first predetermined condition. The notification device 24 is configured to notify a user that the second operating device 18 meets the second predetermined condition. In this embodiment, the notification device 24 is mounted to the additional electric device 20. For example, the notification device 24 includes an indicator such as a light emitting element. The notification device 24 is configured to indicate with light that the function of the first operating device 16 is assigned to the additional electric device 20. The notification device 24 is configured to turn on when the function of the first operating device 16 is assigned to the additional electric device 20. The notification device 24 is configured to turn off when the function of the first operating device 16 is not assigned to the additional electric device 20. However, the notification device 24 can include the display 20S or another component configured to display notification that the function of the first operating device 16 is assigned to the additional electric device 20.

The operating system 10 further comprises a notification device 26. The notification device 26 is configured to notify a user that the first operating device 16 meets the first predetermined condition. In this embodiment, the notification device 26 is mounted to the first operating device 16. For example, the notification device 26 includes an indicator such as a light emitting element. The notification device 26 is configured to indicate with light that the first operating device 16 meets the first predetermined condition. The notification device 26 is configured to turn on when the first operating device 16 meets the first predetermined condition. The notification device 26 is configured to turn off when the first operating device 16 does not meet the first predetermined condition. However, the notification device 26 can include a display or another component configured to display notification that the first operating device 16 meets the first predetermined condition.

The operating system 10 further comprises a notification device 28. The notification device 28 is configured to notify a user that the second operating device 18 meets the second predetermined condition. In this embodiment, the notification device 28 is mounted to the second operating device 18. For example, the notification device 28 includes an indicator such as a light emitting element. The notification device 28 is configured to indicate with light that the second operating device 18 meets the second predetermined condition. The notification device 28 is configured to turn on when the second operating device 18 meets the second predetermined condition. The notification device 28 is configured to turn off when the second operating device 18 does not meet the second predetermined condition. However, the notification device 28 can include a display or another component configured to display notification that the second operating device 18 meets the second predetermined condition.

The control of the operating system 10 will be described referring to FIGS. 6 and 7.

Figure 6:
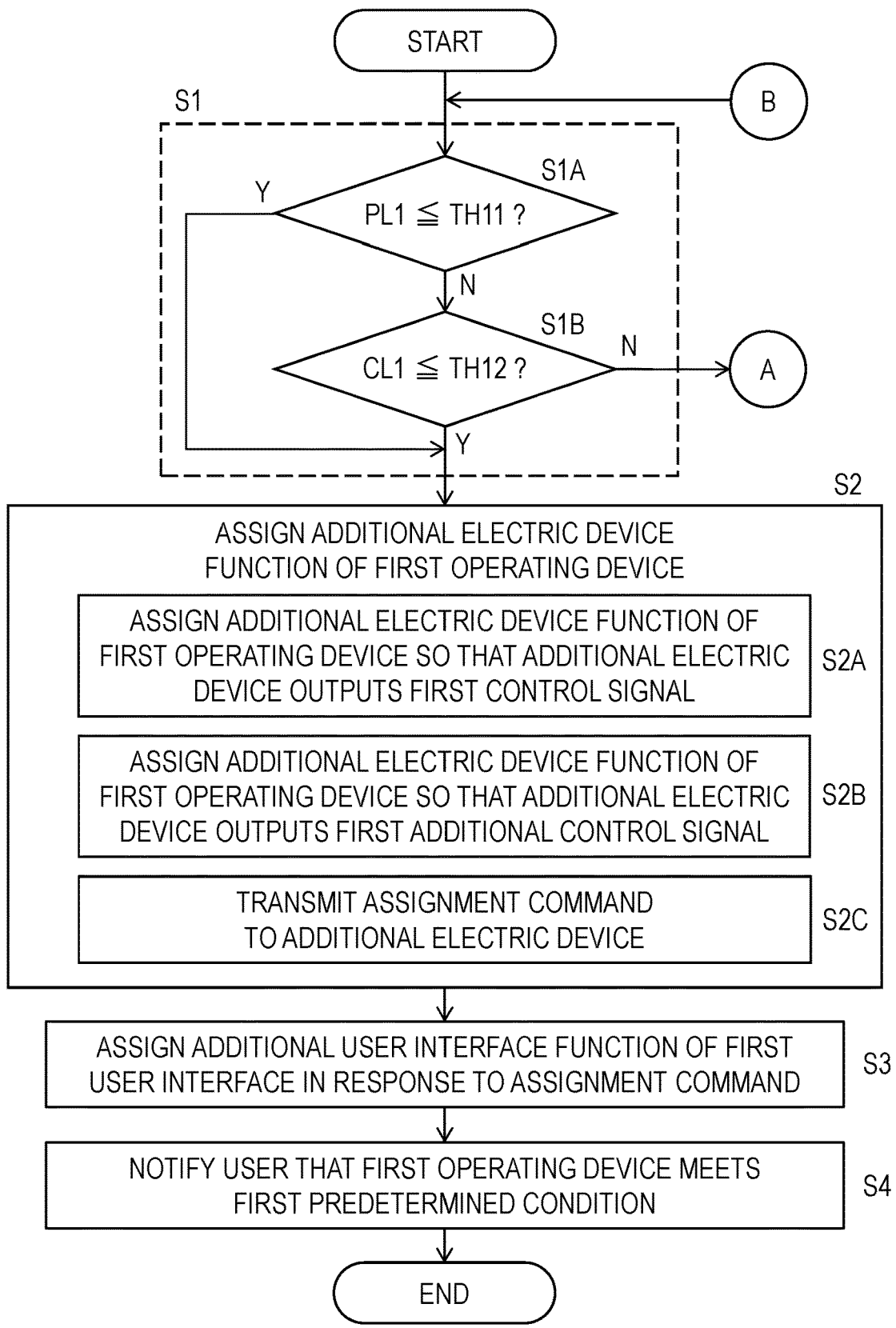
FIGS. 6 and 7 are flowcharts of the operating system of the human-powered vehicle illustrated in FIG. 1.

As seen in FIG. 6, the controller 22 determines whether the first operating device 16 meets the first predetermined condition (Step S1). In this embodiment, the controller 22 determines whether the first operating device 16 meets the first predetermined condition based on the first power-level information PL1 (Step S1A). The controller 22 determines whether the first operating device 16 meets the first predetermined condition based on the first power-level condition in which the first remaining level of the first electric power source 16E is equal to or lower than the first threshold TH11 (Step S1A). The controller 22 concludes that the first operating device 16 meets the first predetermined condition if the first remaining level of the first electric power source 16E is equal to or lower than the first threshold TH11 (Step S1A). The controller 22 concludes that the first operating device 16 does not meet the first predetermined condition if the first remaining level of the first electric power source 16E is higher than the first threshold TH11 (Step S1A).

Furthermore, the controller 22 determines whether the first operating device 16 meets the first predetermined condition based on the first communication-state information CL1 (Step S1B). The controller 22 concludes that the first operating device 16 meets the first predetermined condition if the first communication-state information CL1 is equal to or lower than a first communication-state threshold TH12 (Step S1B). The controller 22 concludes that the first operating device 16 meets the first predetermined condition if the signal strength of the radio waves transmitted from the first operating device 16 is equal to or lower than the first communication-state threshold TH12. The controller 22 concludes that the first operating device 16 do not meet the first predetermined condition if the first communication-state information CL1 is higher than the first communication-state threshold TH12 (Step S1B). The controller 22 concludes that the first operating device 16 meets the first predetermined condition if the signal strength of the radio waves transmitted from the first operating device 16 is higher than the first communication-state threshold TH12. However, one of the Steps S1A and S1B can be omitted.

The controller 22 assigns, if the first operating device 16 meets the first predetermined condition, the additional electric device 20 the function of the first operating device 16 so that the additional electric device 20 outputs the first control signal CS11 (Steps S1 and S2A). In this embodiment, the controller 22 assigns, if the first remaining level of the first electric power source 16E is equal to or lower than the first threshold TH11, the additional electric device 20 the function of the first operating device 16 so that the additional electric device 20 outputs the first control signal CS11 (Steps S1A and S2A). The controller 22 assigns, if the signal strength of the radio waves transmitted from the first operating device 16 is equal to or lower than the first communication-state threshold TH12, the additional electric device 20 the function of the first operating device 16 so that the additional electric device 20 outputs the first control signal CS11 (Steps S1B and S2A).

The controller 22 assigns, if the first operating device 16 meets the first predetermined condition, the additional electric device 20 the function of the first operating device 16 so that the additional electric device 20 outputs the first additional control signal CS12 (Steps S1 and S2B). In this embodiment, the controller 22 assigns, if the first remaining level of the first electric power source 16E is equal to or lower than the first threshold TH1, the additional electric device 20 the function of the first operating device 16 so that the additional electric device 20 outputs the first additional control signal CS12 (Steps S1A and S2B). The controller 22 assigns, if the signal strength of the radio waves transmitted from the first operating device 16 is equal to or lower than the first communication-state threshold TH12, the additional electric device 20 the function of the first operating device 16 so that the additional electric device 20 outputs the first additional control signal CS12 (Steps S1B and S2B).

In this embodiment, if the first operating device 16 meets the first predetermined condition, the controller 22 transmits, to the additional electric device 20, the assignment command AC1 indicating that the function of the first operating device 16 is assigned to the additional electric device 20 (Steps S1 and S2C). The additional electric device 20 assigns the additional user interface 20A the function of the first user interface 16A in response to the assignment command AC1 (Step S3). The notification device 24 notifies a user that the first operating device 16 meets the first predetermined condition in response to the assignment command AC1 (Step S4). The notification device 26 of the first operating device 16 notifies a user that the first operating device 16 meets the first predetermined condition (Step S4).

Figure 7:
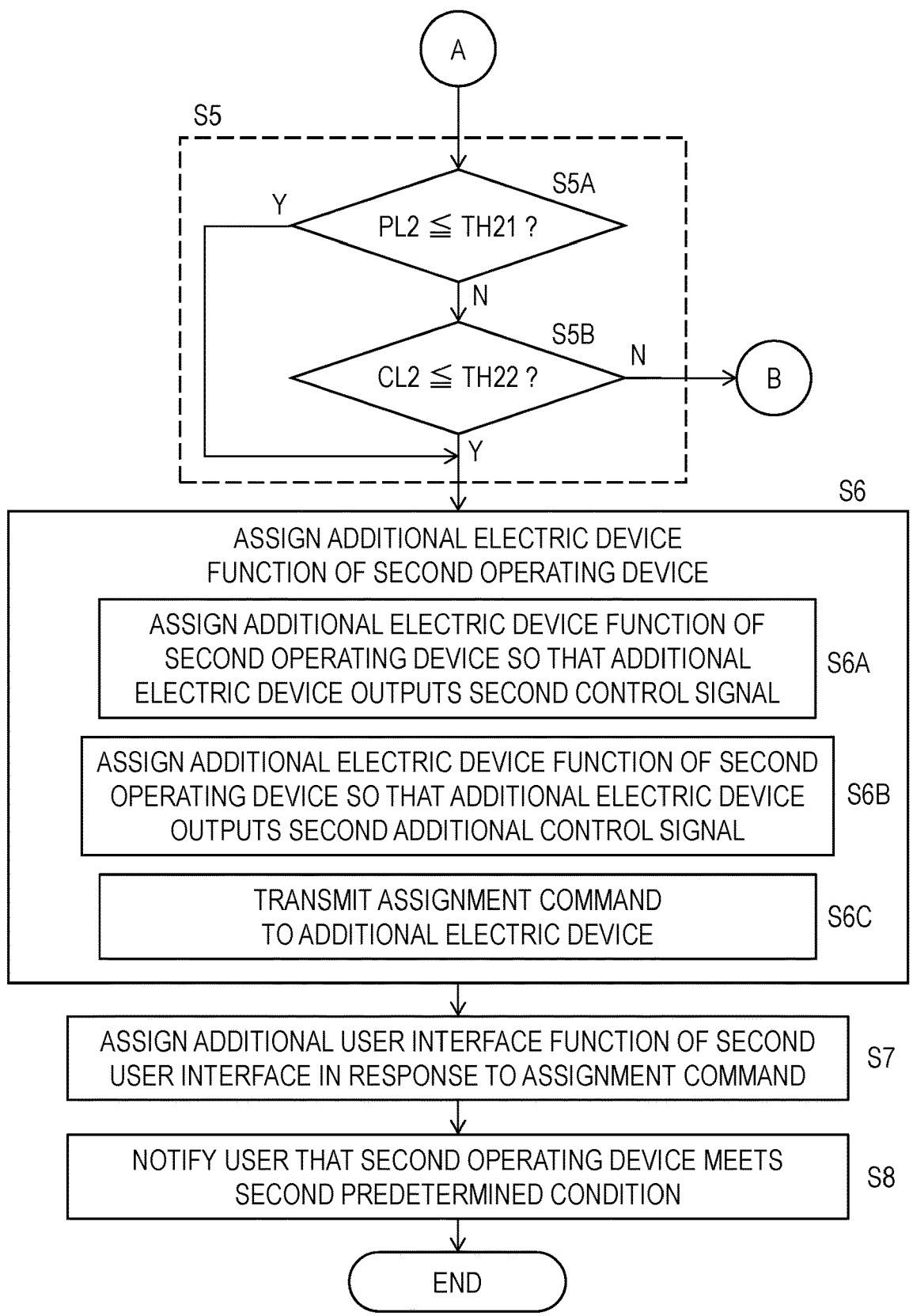

As seen in FIGS. 6 and 7, if the first operating device 16 does not meet the first predetermined condition, the controller 22 determines whether the second operating device 18 meets the second predetermined condition (Steps S1 and S5). In this embodiment, the controller 22 determines whether the second operating device 18 meets the second predetermined condition based on the second power-level information PL2 (Step S5A).

As seen in FIG. 7, the controller 22 determines whether the second operating device 18 meets the second predetermined condition based on the second power-level condition in which the second remaining level of the second electric power source 18E is equal to or lower than the second threshold TH21 (Step S5A). The controller 22 concludes that the second operating device 18 meets the second predetermined condition if the second remaining level of the second electric power source 18E is equal to or lower than the second threshold TH21 (Step S5A). The controller 22 concludes that the second operating device 18 does not meet the second predetermined condition if the second remaining level of the second electric power source 18E is higher than the second threshold TH21 (Step S5A).

Furthermore, the controller 22 determines whether the second operating device 18 meets the second predetermined condition based on the second communication-state information CL2 (Step S5B). The controller 22 concludes that the second operating device 18 meets the second predetermined condition if the second communication-state information CL2 is equal to or lower than a second communication-state threshold TH22 (Step S5B). The controller 22 concludes that the second operating device 18 meets the second predetermined condition if the signal strength of the radio waves transmitted from the second operating device 18 is equal to or lower than the second communication-state threshold TH22. The controller 22 concludes that the second operating device 18 do not meet the second predetermined condition if the second communication-state information CL2 is higher than the second communication-state threshold TH22 (Step S5B). The controller 22 concludes that the second operating device 18 meets the second predetermined condition if the signal strength of the radio waves transmitted from the second operating device 18 is higher than the second communication-state threshold TH22. However, one of the Steps S1A and S1B can be omitted.

The controller 22 assigns, if the second operating device 18 meets the second predetermined condition, the additional electric device 20 the function of the second operating device 18 so that the additional electric device 20 outputs the second control signal CS21 (Steps S5 and S6A). In this embodiment, the controller 22 assigns, if the second remaining level of the second electric power source 18E is equal to or lower than the second threshold TH21, the additional electric device 20 the function of the second operating device 18 so that the additional electric device 20 outputs the second control signal CS21 (Steps S5A and S6A). The controller 22 assigns, if the signal strength of the radio waves transmitted from the second operating device 18 is equal to or lower than the second communication-state threshold TH22, the additional electric device 20 the function of the second operating device 18 so that the additional electric device 20 outputs the second control signal CS21 (Steps S5B and S6A).

The controller 22 assigns, if the second operating device 18 meets the second predetermined condition, the additional electric device 20 the function of the second operating device 18 so that the additional electric device 20 outputs the second additional control signal CS22 (Steps S5 and S6B). In this embodiment, the controller 22 assigns, if the second remaining level of the second electric power source 18E is equal to or lower than the second threshold TH21, the additional electric device 20 the function of the second operating device 18 so that the additional electric device 20 outputs the second additional control signal CS22 (Steps S5A and S6B). The controller 22 assigns, if the signal strength of the radio waves transmitted from the second operating device 18 is equal to or lower than the second communication-state threshold TH22, the additional electric device 20 the function of the second operating device 18 so that the additional electric device 20 outputs the second additional control signal CS22 (Steps S5B and S6B).

In this embodiment, if the second operating device 18 meets the second predetermined condition, the controller 22 transmits, to the additional electric device 20, the assignment command AC2 indicating that the function of the second operating device 18 is assigned to the additional electric device 20 (Steps S5 and S6C). The additional electric device 20 assigns the additional user interface 20A the function of the second user interface 18A in response to the assignment command AC2 (Step S7). The notification device 24 notifies a user that the second operating device 18 meets the second predetermined condition in response to the assignment command AC2 (Step S8). The notification device 28 of the second operating device 18 notifies a user that the second operating device 18 meets the second predetermined condition (Step S4).

Second Embodiment

An operating system 210 in accordance with a second embodiment will be described below referring to FIGS. 8 to 10. The operating system 210 has the same structure and/or configuration as those of the operating system 210 except for the controller 22. Thus, elements having substantially the same function as those in the first embodiment will be numbered the same here and will not be described and/or illustrated again in detail here for the sake of brevity.

Figure 8:
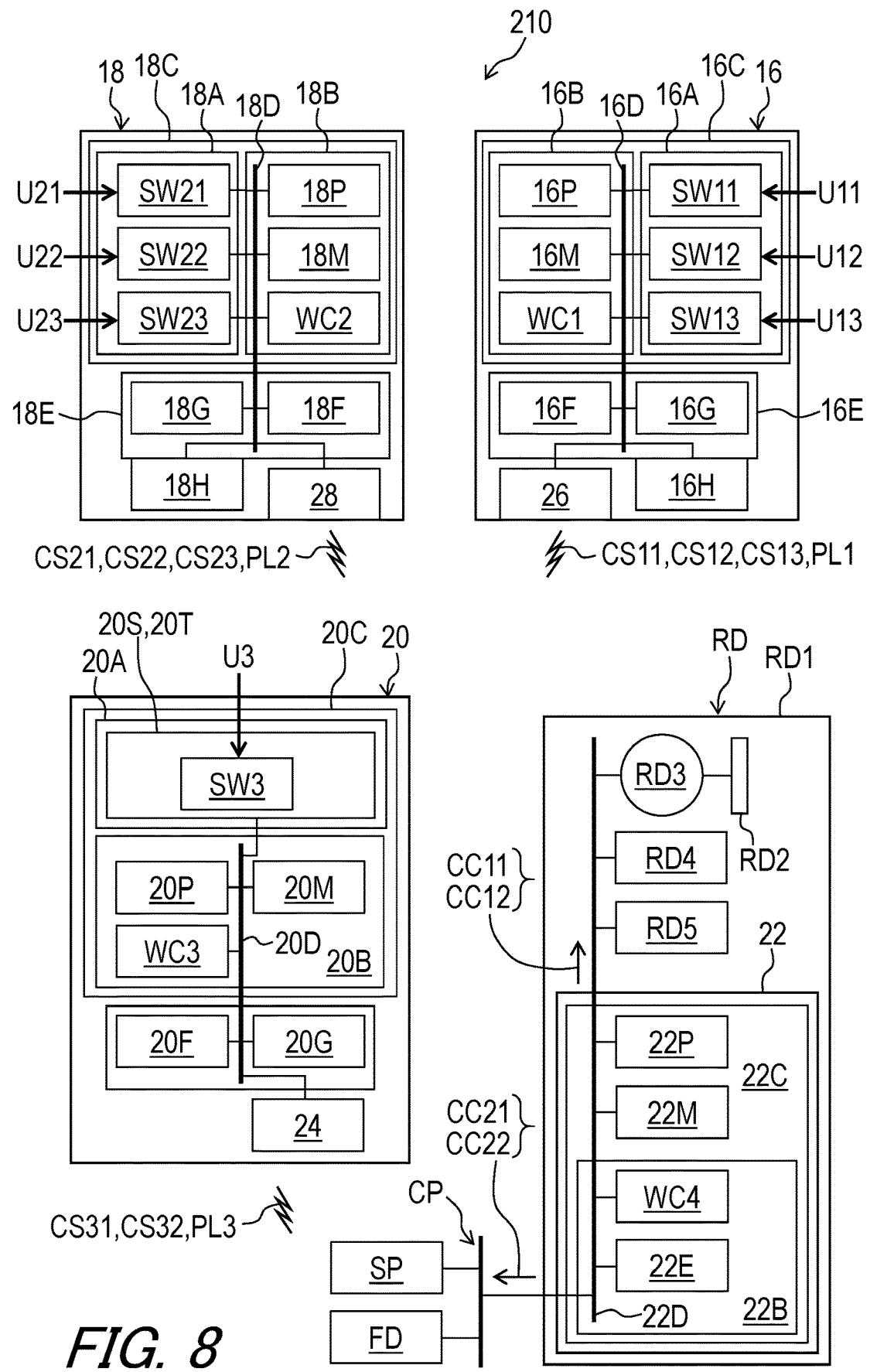
FIG. 8 is a schematic block diagram of an operating system in accordance with a second embodiment.

As seen in FIG. 8, the operating system 210 for the human-powered vehicle VH comprises the first operating device 16 and the controller 22. In this embodiment, the second operating device 18 can also be referred to as an additional electric device 18. Namely, the operating system 210 further comprises the additional electric device 18. The controller 22 is configured to assign, if the first operating device 16 meets the first predetermined condition, the additional electric device 18 the function of the first operating device 16 so that the additional electric device 18 outputs the control signal. The second user interface 18A can also be referred to as an additional user interface 18A. Namely, the additional electric device 18 includes the additional user interface 18A.

Figure 9:
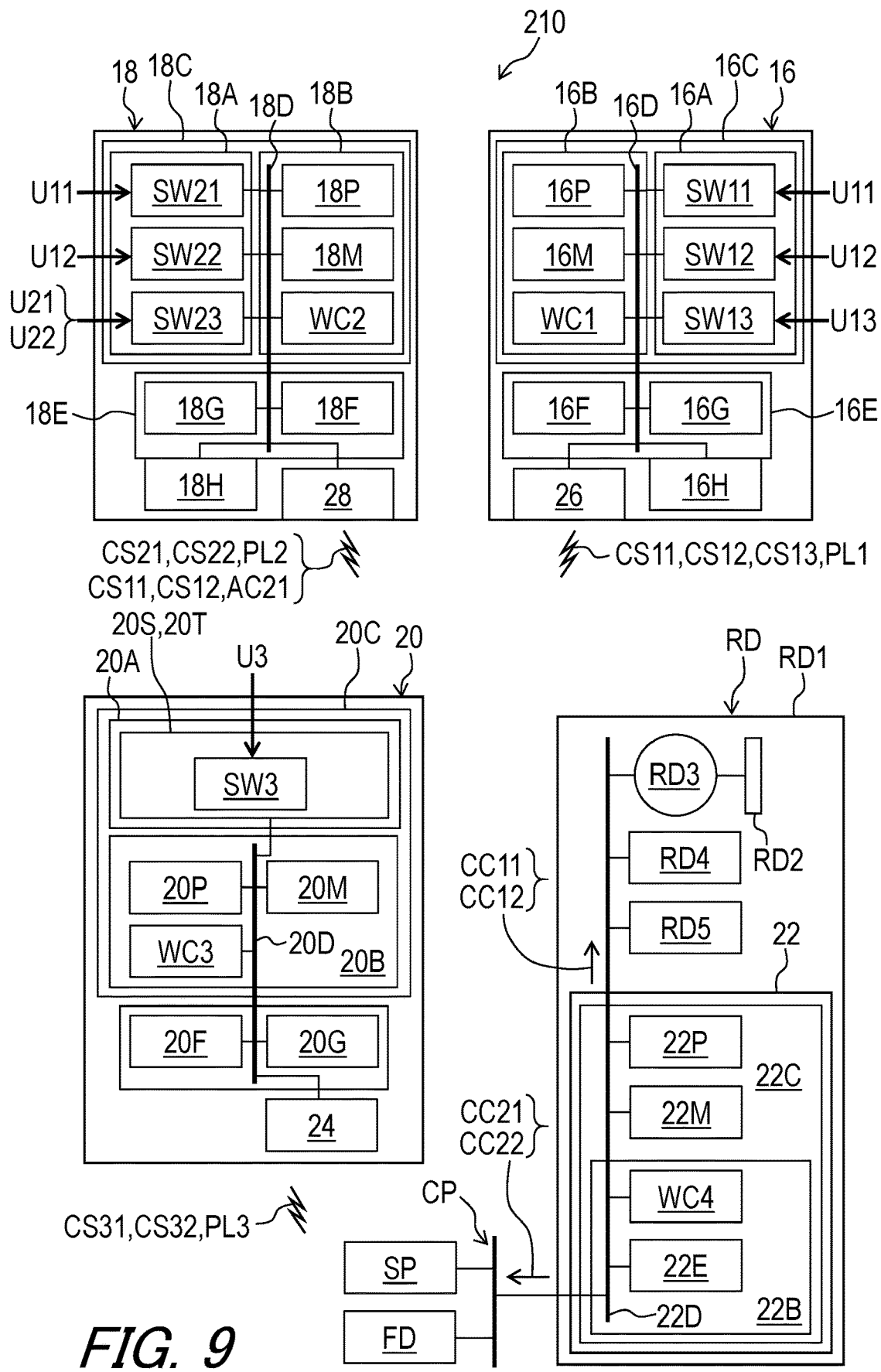
FIG. 9 is a schematic block diagram of the operating system illustrated in FIG. 8.

As seen in FIG. 9, the controller 22 is configured to assign, if the first operating device 16 meets the first predetermined condition, the additional user interface 18A the function of the first user interface 16A. In this embodiment, if the first operating device 16 meets the first predetermined condition, the controller 22 is configured to transmit, to the additional electric device 18, an assignment command AC21 indicating that the function of the first operating device 16 is assigned to the additional electric device 18.

The additional communicator 18B is configured to transmit the first control signal CS11 if the controller 22 assigns the additional electric device 18 the function of the first operating device 16. The additional electric device 18 is configured to assign the additional user interface 18A the function of the first user interface 16A in response to the assignment command AC21. The additional electric device 18 is configured to store the function of the first operating device 16 in the second memory 18M. The additional electric device 18 is configured to store the function of the first user interface 16A of the first operating device 16 in the second memory 18M. The function of the first operating device 16 is associated with the assignment command AC21. The function of the first user interface 16A of the first operating device 16 is associated with the assignment command AC21.

For example, the additional communicator 18B is configured to assign the second electrical switch SW21 the function of the first electrical switch SW11 in response to the assignment command AC21. The additional communicator 18B is configured to assign the second additional electrical switch SW22 the function of the first additional electrical switch SW12 in response to the assignment command AC21. The additional communicator 18B is configured to assign the second additional electrical switch SW23 the functions of the second electrical switch SW21 and the second additional electrical switch SW22 in response to the assignment command AC21.

The second electrical switch SW21 is configured to receive the first user input U11. The additional communicator 18B is configured to generate the first control signal CS11 in response to the first user input U11 received by the second electrical switch SW21. The second additional electrical switch SW22 is configured to receive the first additional user input U12. The additional communicator 18B is configured to generate the first additional control signal CS12 in response to the first additional user input U12 received by the second additional electrical switch SW22. The second additional electrical switch SW23 is configured to alternately receive the second user input U21 and the second additional user input U22. The additional communicator 18B is configured to alternately generate the second control signal CS21 and the second additional control signal CS22 in response to the second user input U21 and the second additional user input U22 alternately received by the second additional electrical switch SW23. The second electrical switch SW21 can also be referred to as a first electrical switch SW21. The second additional electrical switch SW22 can also be referred to as a second electrical switch SW22. The second additional electrical switch SW23 can also be referred to as a third electrical switch SW23. The first additional user input U12 can also be referred to as a second user input U12. The second user input U21 can also be referred to as a third user input U21. The second additional user input U22 can also be referred to as a third user input U22 or a third additional user input U22.

Figure 10:
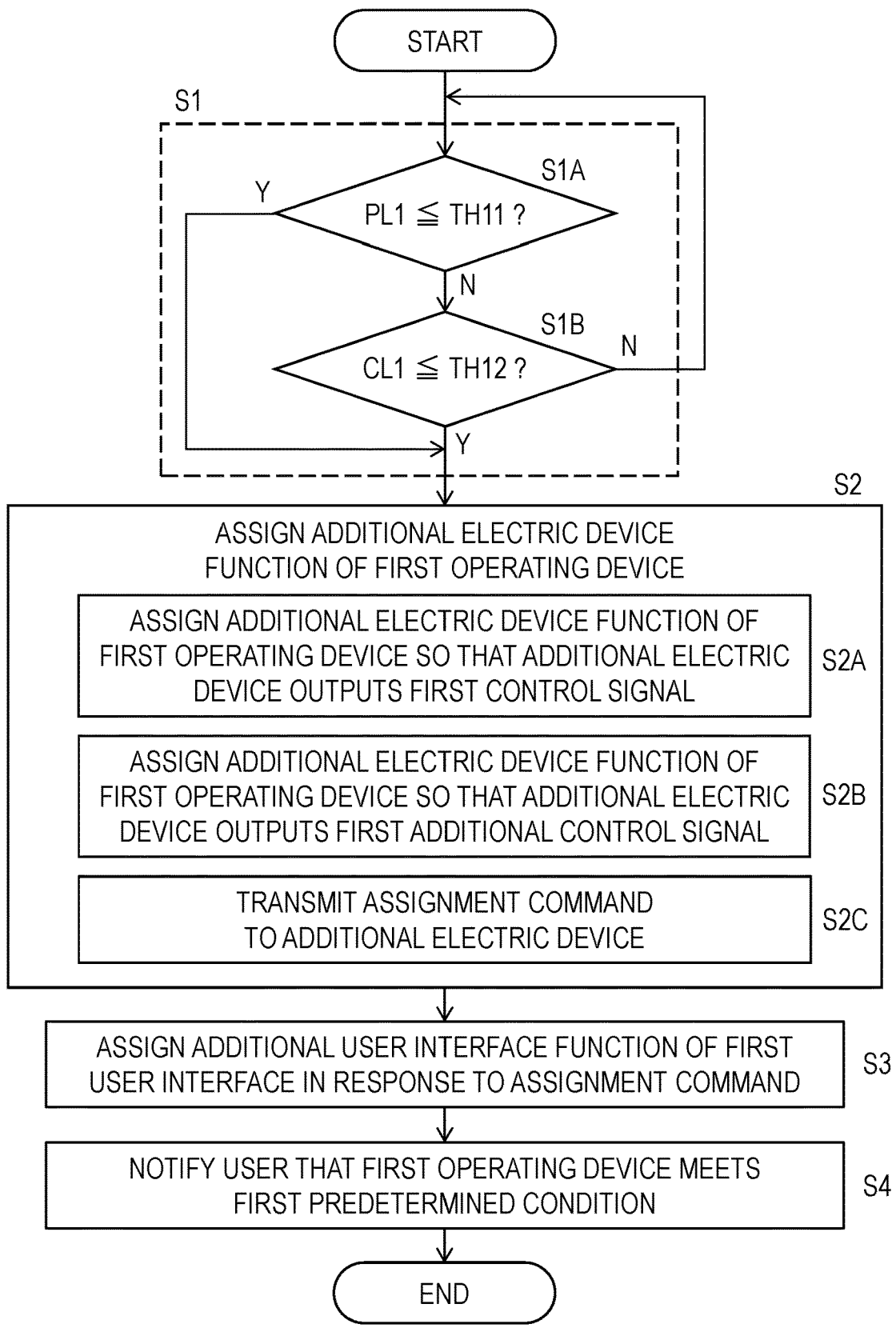
FIG. 10 is a flowchart of the operating system illustrated in FIG. 8.

As seen in FIG. 10, the control of the operating system 210 includes the Steps S1 to S4 included in the operating system 10 of the first embodiment. Thus, they will not be described in detail here for the sake of brevity.

Third Embodiment

An operating system 310 in accordance with a third embodiment will be described below referring to FIGS. 11 to 13. The operating system 310 has the same structure and/or configuration as those of the operating system 310 except for the first communicator, the second communicator, and the additional communicator. Thus, elements having substantially the same function as those in the first embodiment will be numbered the same here and will not be described and/or illustrated again in detail here for the sake of brevity.

Figure 11:
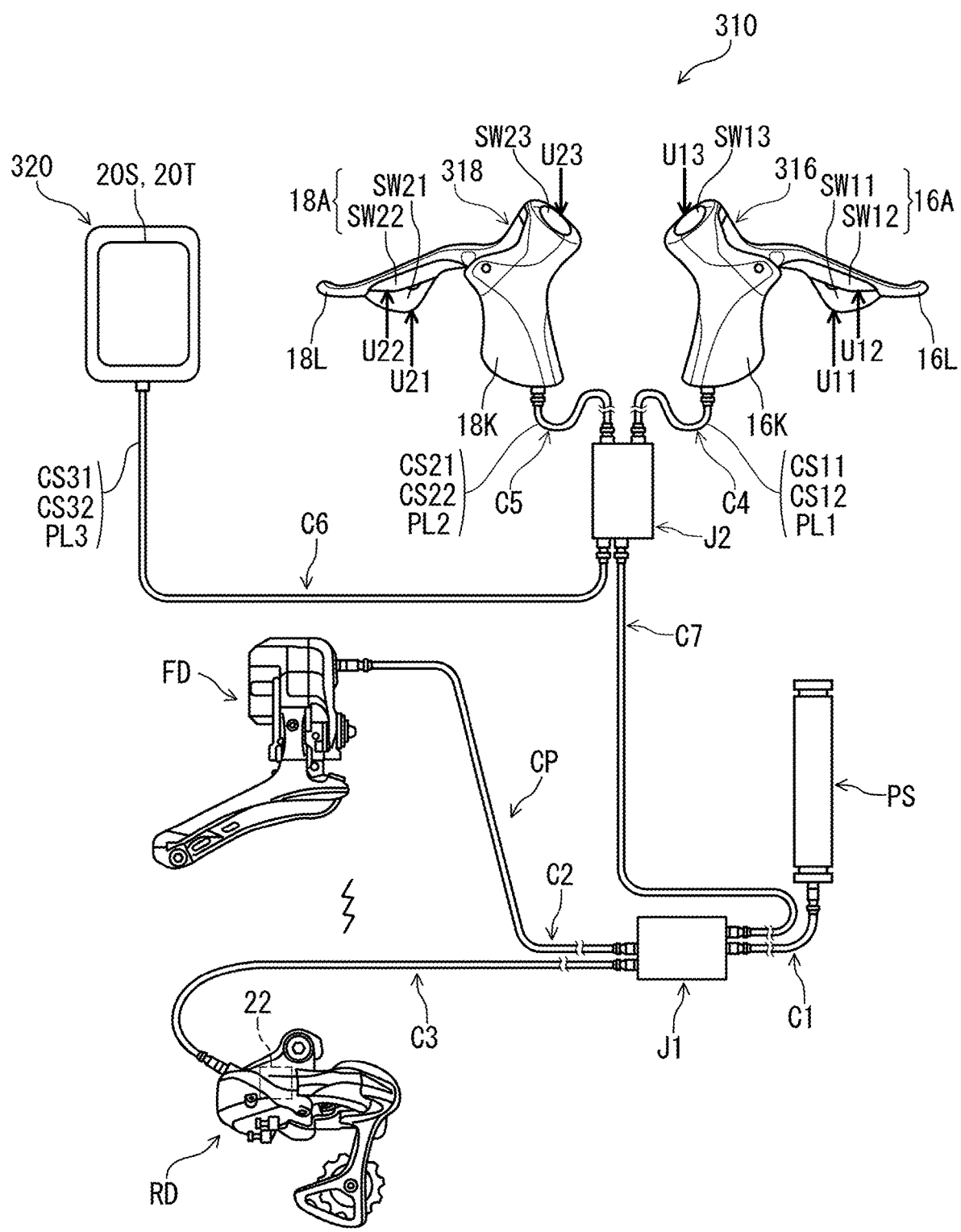
FIG. 11 is a side elevational view of a human-powered vehicle including an operating system in accordance with a third embodiment.
Figure 12:
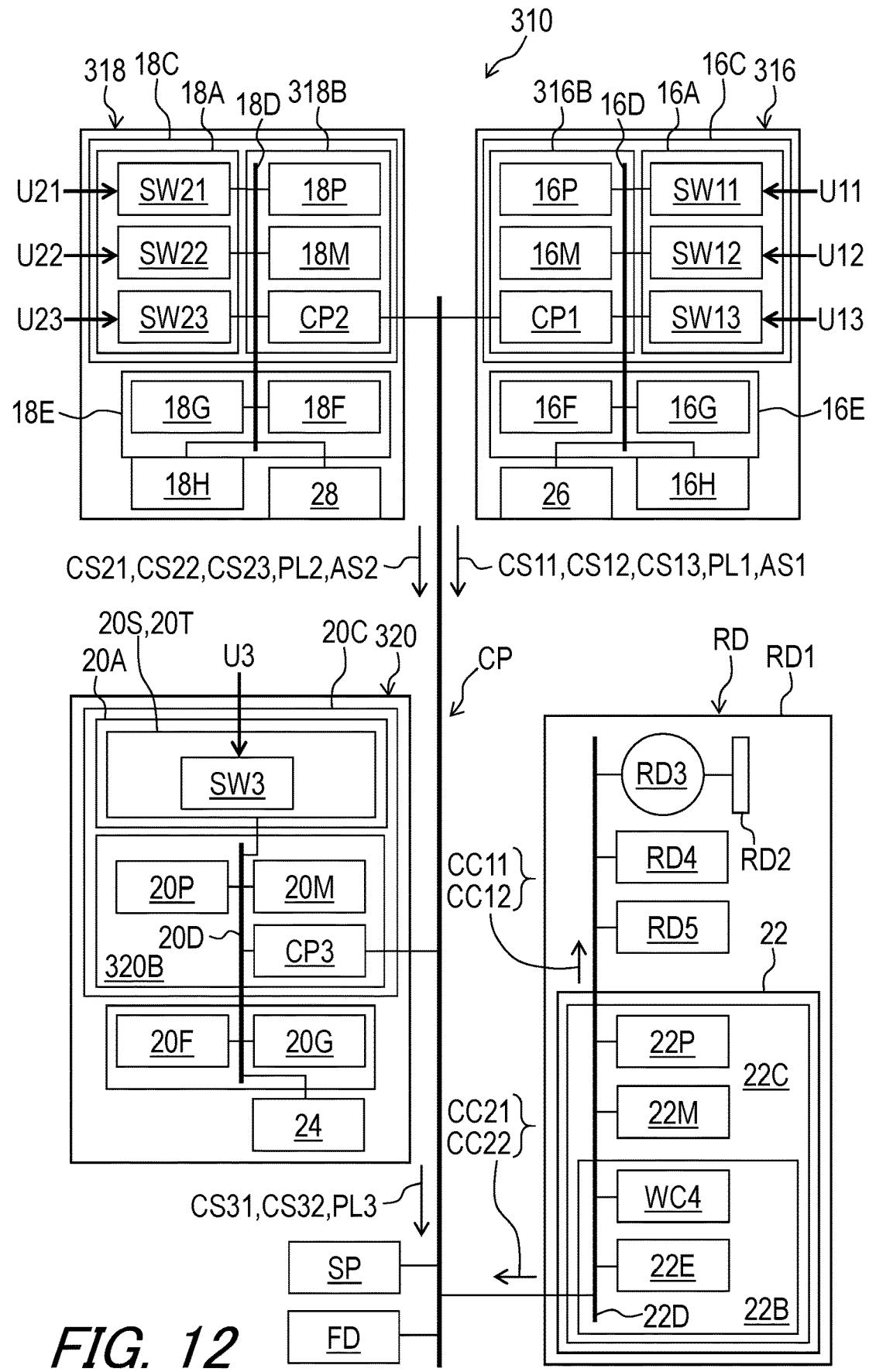
FIG. 12 is a schematic diagram of the operating system of the human-powered vehicle illustrated in FIG. 11.

As seen in FIGS. 11 and 12, the operating system 310 for the human-powered vehicle VH comprises a first operating device 316 and the controller 22. The operating system 310 further comprises a second operating device 318. The operating system 310 further comprises an additional electric device 320. As seen in FIG. 13, the controller 22 is configured to assign, if the first operating device 316 meets the first predetermined condition, the additional electric device 320 the function of the first operating device 316 so that the additional electric device 320 outputs the first control signal CS11. As seen in FIG. 14, the controller 22 is configured to assign, if the second operating device 318 meets the first predetermined condition, the additional electric device 320 the function of the second operating device 318 so that the additional electric device 320 outputs the second control signal CS21.

As seen in FIG. 12, the first operating device 316 has substantially the same structure as the structure of the first operating device 16 of the first embodiment. The first operating device 316 includes a first communicator 316B configured to transmit the first control signal CS11. The first communicator 316B has substantially the same structure as the structure of the first communicator 16B of the first embodiment. In this embodiment, the first communicator 316B includes a first communication port CP1 configured to be connected to a first electric cable C4. The first communicator 316B is configured to transmit the first control signal CS11 via the first communication port CP1. The first communication port CP1 is configured to be connected to a junction J2 with the first electric cable C4. The first wireless communicator WC1 is omitted in the first operating device 316.

The second operating device 318 has substantially the same structure as the structure of the second operating device 18 of the first embodiment. The second operating device 318 includes a second communicator 318B configured to transmit the second control signal CS21. The second communicator 318B has substantially the same structure as the structure of the second communicator 18B of the second embodiment. In this embodiment, the second communicator 18B includes a second communication port CP2 configured to be connected to a second electric cable C5. The second communicator 18B is configured to transmit the second control signal CS21 via the second communication port CP2. The second communication port CP2 is configured to be connected to the junction J2 with the second electric cable C5. The second wireless communicator WC2 is omitted in the second operating device 318.

As seen in FIG. 12, the additional electric device 320 has substantially the same structure as the structure of the additional electric device 20 of the first embodiment. The additional electric device 320 includes an additional communicator 320B. The additional communicator 320B has substantially the same structure as the structure of the additional communicator 20B of the first embodiment. The additional wireless communicator WC3 is omitted in the additional communicator 320B. In this embodiment, the additional communicator 320B includes an additional communication port CP3 configured to be connected to an additional electric cable C6. The additional communication port CP3 is configured to be connected to the junction J2 with the additional electric cable C6. The junction J2 is electrically connected to the junction J1 with an electric cable C7.

Figure 13:
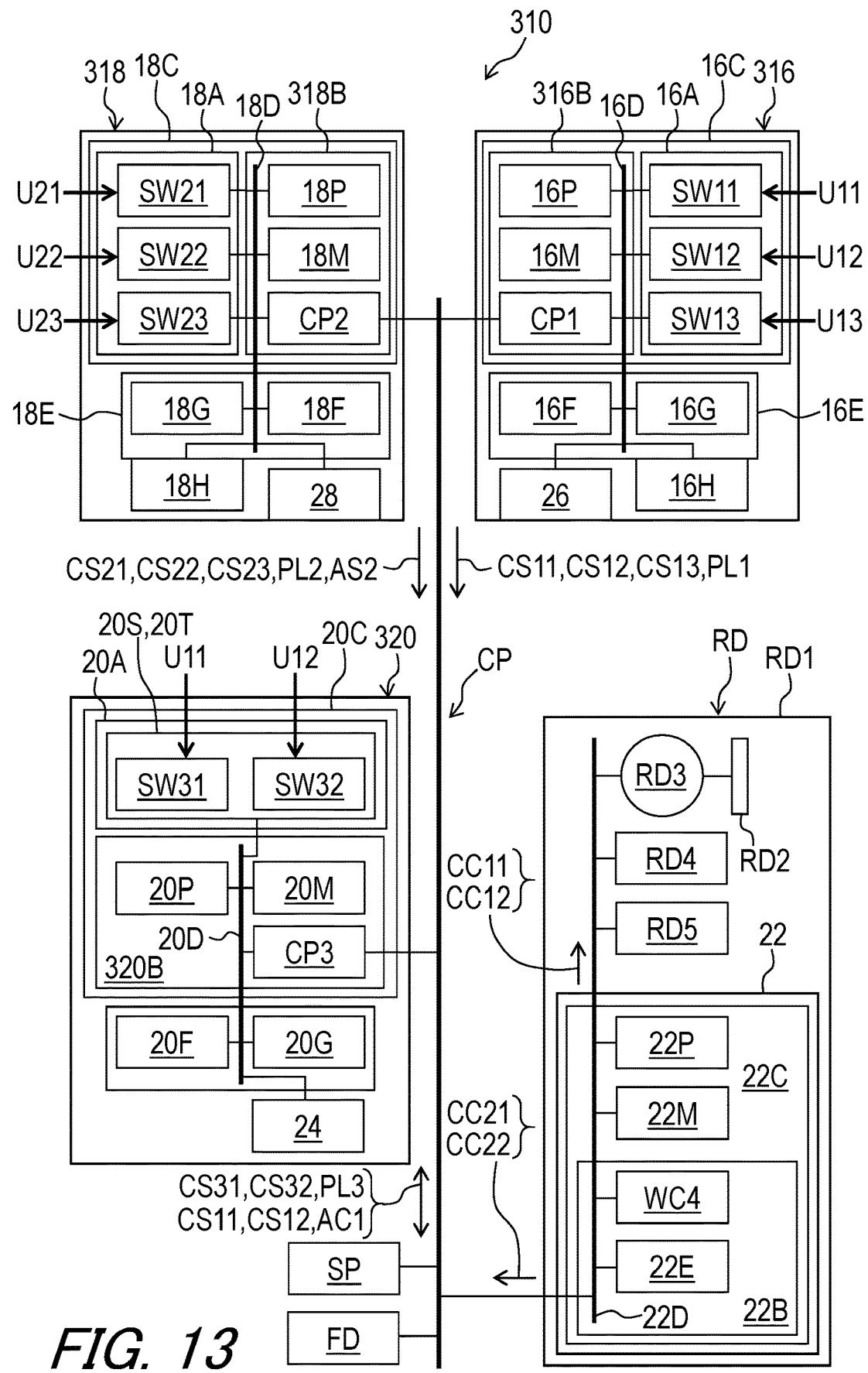
FIG. 13 is a schematic block diagram of the operating system of the human-powered vehicle illustrated in FIG. 11.
Figure 14:
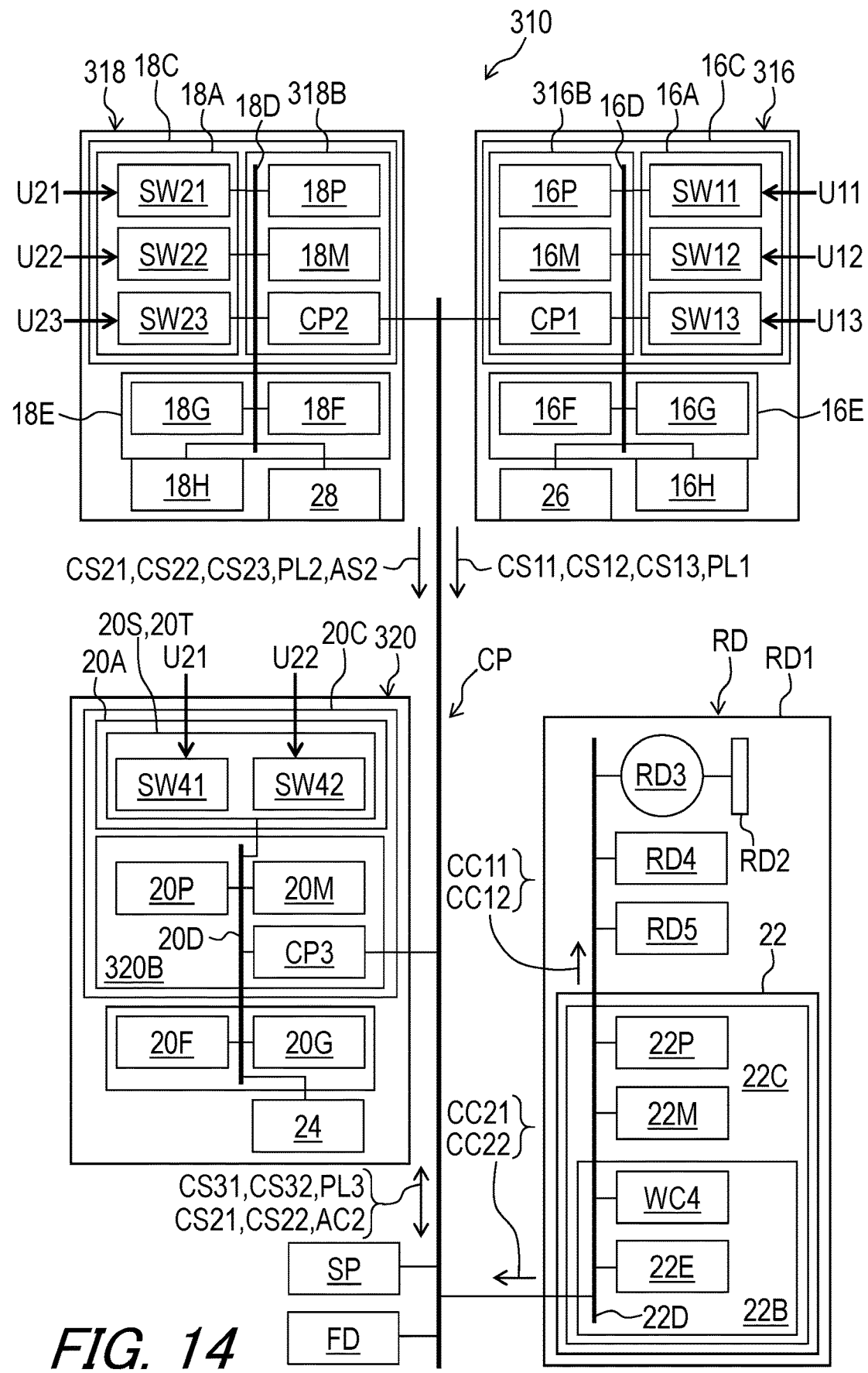
FIG. 14 is a schematic block diagram of the operating system of the human-powered vehicle illustrated in FIG. 11.

As seen in FIG. 13, the additional communicator 320B is configured to transmit the first control signal CS11 if the controller 22 assigns the additional electric device 320 the function of the first operating device 316. The additional communicator 320B is configured to transmit the first control signal CS11 via the additional communication port CP3 if the controller 22 assigns the additional electric device 320 the function of the first operating device 316.

As seen in FIG. 14, the additional communicator 20B is configured to transmit the second control signal CS21 if the controller 22 assigns the additional electric device 320 the function of the second operating device 318. The additional communicator 320B is configured to transmit the second control signal CS21 via the additional communication port CP3 if the controller 22 assigns the additional electric device 320 the function of the second operating device 318.

As seen in FIG. 12, the controller 22 is configured to receive the first communication-state information CL1 indicating the communication state between the communicator 22B of the controller 22 and the first communicator 316B of the first operating device 316. The controller 22 is configured to determine whether the first operating device 316 meets the first predetermined condition based on the first communication-state information CL1. In this embodiment, the first communication-state information CL1 includes an acknowledge signal AS1 from the first operating device 316. The first communicator 316B is configured to transmit the acknowledge signal AS1 to the controller 22.

The controller 22 is configured to receive the second communication-state information CL2 indicating the communication state between the communicator 22B of the controller 22 and the second communicator 18B of the second operating device 18. The controller 22 is configured to determine whether the second operating device 18 meets the second predetermined condition based on the second communication-state information CL2. In this embodiment, the second communication-state information CL2 includes an acknowledge signal AS2 from the second operating device 318. The second communicator 318B is configured to transmit the acknowledge signal AS2 to the controller 22.

Figure 15:
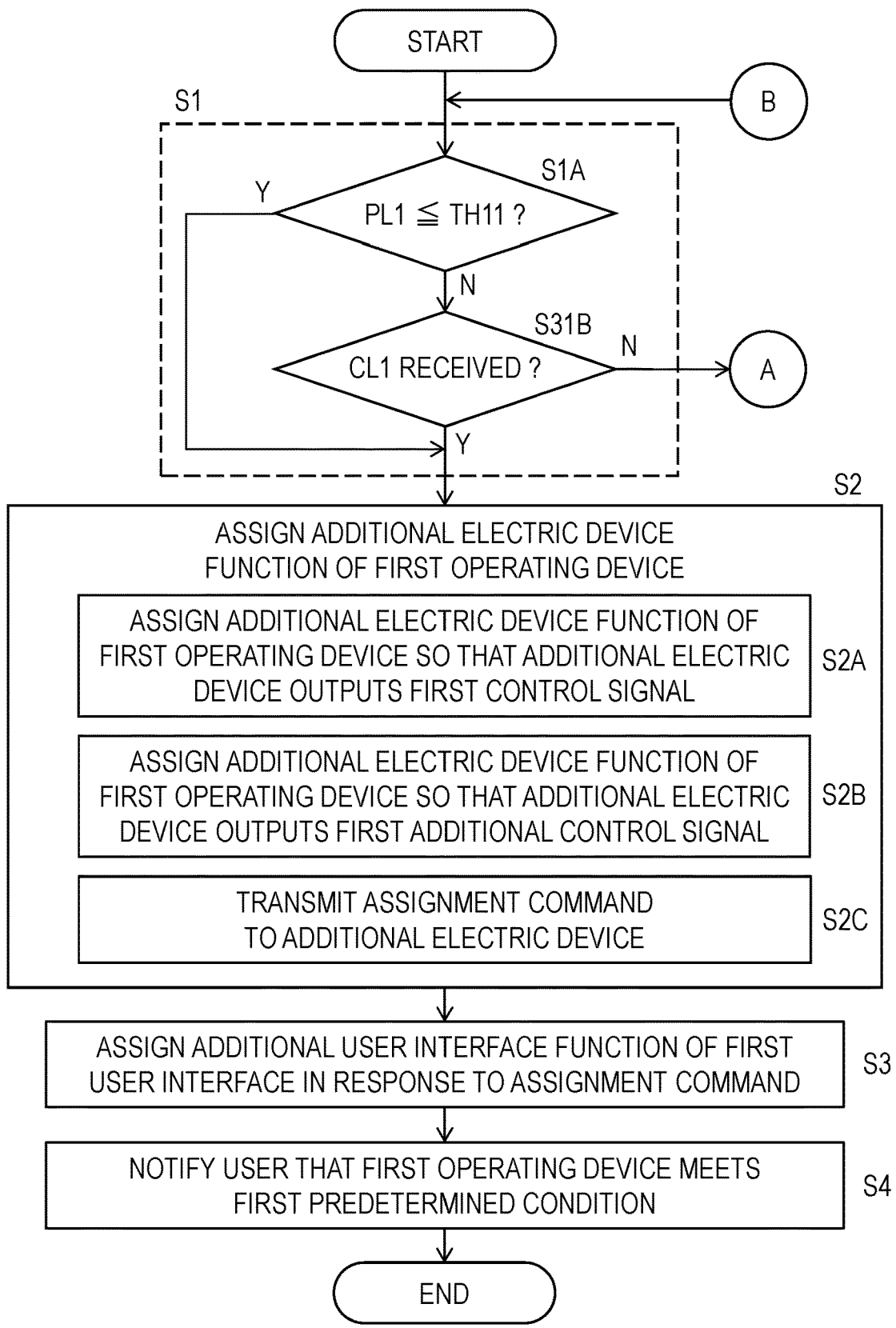
FIGS. 15 and 16 are flowcharts of the operating system of the human-powered vehicle illustrated in FIG. 11.
Figure 16:
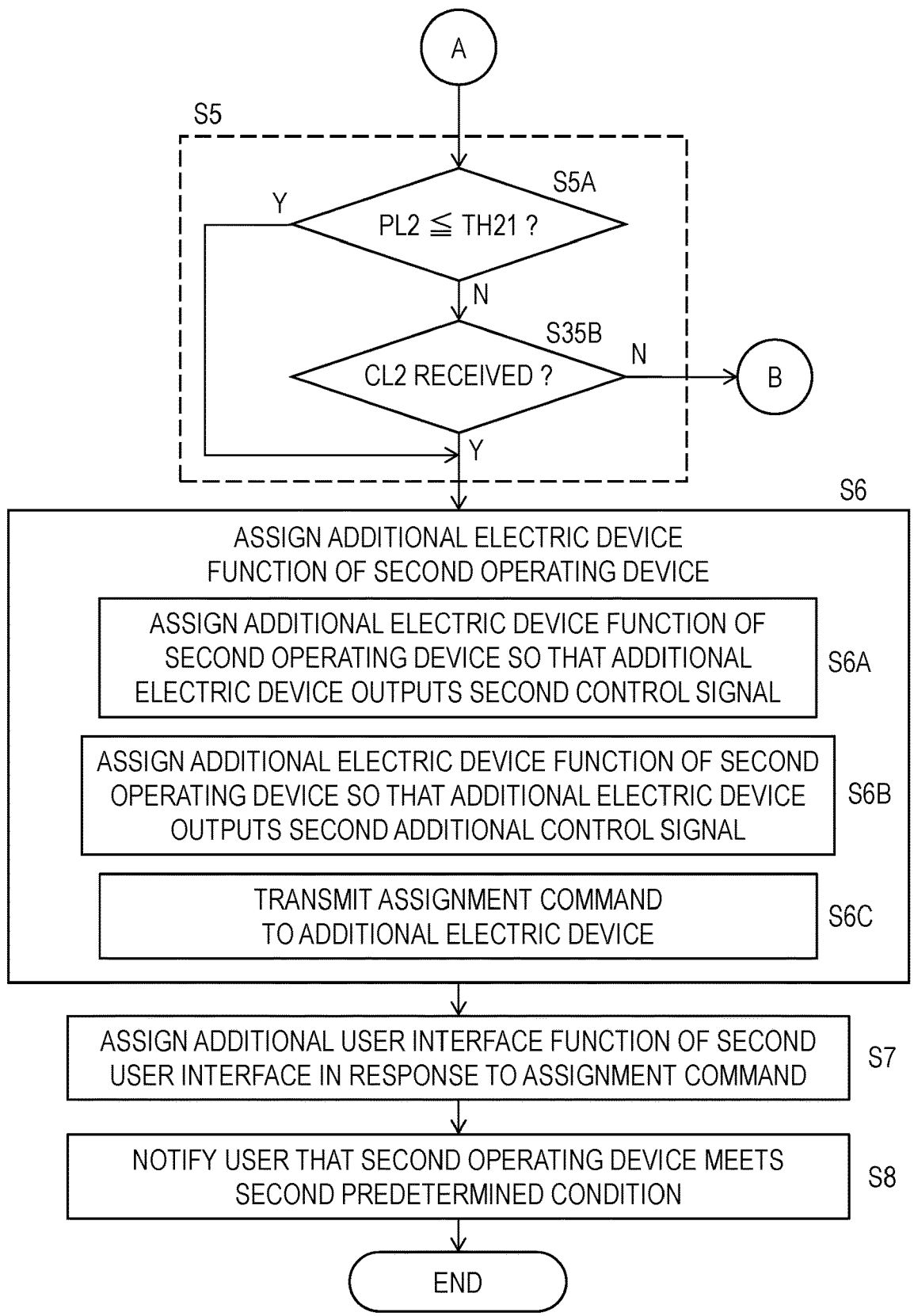

As seen in FIGS. 15 and 16, Step S1B is replaced with Step S31B, and Step S5B is replaced with Step S35B. In Step S31B, the controller 22 determines whether the controller 22 receives the first communication-state information CL1 such as the acknowledge signal AS1. However, one of the Steps S1A and S31B can be omitted. In Step S35B, the controller 22 determines whether the controller 22 receives the second communication-state information CL2 such as the acknowledge signal AS2. However, one of the Steps S1A and S35B can be omitted. Other steps are substantially the same as those of the flowcharts depicted in FIGS. 6 and 7. Thus, they will not be described in detail here for the sake of brevity.

In accordance with a first aspect, an operating system for a human-powered vehicle comprises a first operating device and a controller. The first operating device is configured to output a first control signal. The controller is configured to determine whether the first operating device meets a first predetermined condition. The controller is configured to assign, if the first operating device meets the first predetermined condition, an additional electric device a function of the first operating device so that the additional electric device outputs the first control signal.

With the operating system according to the first aspect, it is possible to operate a component using the additional electric device if the first operating device meets the first predetermined condition. Thus, it is possible to improve convenience of the operating system.

In accordance with a second aspect, the operating system according to the first aspect is configured so that the first operating device includes a first electric power source. The controller is configured to determine whether the first operating device meets the first predetermined condition based on a first power-level condition in which a first remaining level of the first electric power source is equal to or lower than a first threshold.

With the operating system according to the second aspect, it is possible to operate a component using the additional electric device if the first remaining level of the first electric power source is equal to or lower than the first threshold. Thus, it is possible to use the additional electric device as a backup device for the first operating device.

In accordance with a third aspect, the operating system according to the second aspect is configured so that the controller is configured to receive first power-level information indicating the first remaining level of the first electric power source from the first operating device. The controller is configured to determine whether the first operating device meets the first predetermined condition based on the first power-level information.

With the operating system according to the third aspect, it is possible to use the additional electric device as a backup device for the first operating device even if the first remaining level of the first electric power source is equal to or lower than the first threshold.

In accordance with a fourth aspect, the operating system according to the third aspect is configured so that the first operating device includes a first power-level detector configured to detect the first remaining level of the first electric power source. The controller is configured to receive the first power-level information based on the first remaining level detected by the first power-level detector.

With the operating system according to the fourth aspect, it is possible to reliably obtain the first power-level information.

In accordance with a fifth aspect, the operating system according to the first aspect further comprises the additional electric device. The first operating device includes a first communicator configured to transmit the first control signal. The additional electric device includes an additional communicator configured to transmit the first control signal if the controller assigns the additional electric device the function of the first operating device.

With the operating system according to the fifth aspect, it is possible to reliably assign the additional electric device the function of the first operating device.

In accordance with a sixth aspect, the operating system according to the fifth aspect is configured so that the first communicator includes a first wireless communicator configured to wirelessly transmit the first control signal. The additional communicator includes an additional wireless communicator configured to wirelessly transmit the first control signal if the controller assigns the additional electric device the function of the first operating device.

With the operating system according to the sixth aspect, it is possible to wirelessly transmit the first control signal using the first wireless communicator and the additional wireless communicator. Thus, it is possible to omit an electric cable, simplifying the structure of the operating system.

In accordance with a seventh aspect, the operating system according to the fifth aspect is configured so that the first communicator includes a first communication port configured to be connected to a first electric cable, the first communicator being configured to transmit the first control signal via the first communication port. The additional communicator includes an additional communication port configured to be connected to an additional electric cable, the additional communicator being configured to transmit the first control signal via the additional communication port if the controller assigns the additional electric device the function of the first operating device.

With the operating system according to the seventh aspect, it is possible to transmit the first control signal using an electric cable. Thus, it is possible to reliably transmit the first control signal regardless of environmental radio wave.

In accordance with an eighth aspect, the operating system according to any one of the fifth to seventh aspects is configured so that the controller includes a communicator configured to communicate with the first communicator. The controller is configured to receive first communication-state information indicating a communication state between the communicator of the controller and the first communicator of the first operating device. The controller is configured to determine whether the first operating device meets the first predetermined condition based on the first communication-state information.

With the operating system according to the eighth aspect, it is possible to operate a component using the additional electric device if the first operating device meets the first predetermined condition based on the first communication-state information.

In accordance with a ninth aspect, the operating system according to the first aspect further comprises a second operating device configured to output a second control signal. The controller is configured to determine whether the second operating device meets a second predetermined condition. The controller is configured to assign, if the second operating device meets the second predetermined condition, the additional electric device a function of the second operating device so that the additional electric device outputs the second control signal.

With the operating system according to the ninth aspect, it is possible to operate a component using the additional electric device if the second operating device meets the second predetermined condition. Thus, it is possible to improve convenience of the operating system.

In accordance with a tenth aspect, the operating system according to the ninth aspect is configured so that the second operating device includes a second electric power source. The controller is configured to determine whether the second operating device meets the second predetermined condition in which a second remaining level of the second electric power source is equal to or lower than a second threshold.

With the operating system according to the tenth aspect, it is possible to operate a component using the additional electric device if the second remaining level of the second electric power source is equal to or lower than the second threshold. Thus, it is possible to use the additional electric device as a backup device for the second operating device.

In accordance with an eleventh aspect, the operating system according to the tenth aspect is configured so that the controller is configured to receive second power-level information indicating the second remaining level of the second electric power source from the second operating device. The controller is configured to determine whether the second operating device meets the second predetermined condition based on the second power-level information.

With the operating system according to the eleventh aspect, it is possible to use the additional electric device as a backup device for the second operating device even if the second remaining level of the second electric power source is equal to or lower than the second threshold.

In accordance with a twelfth aspect, the operating system according to the eleventh aspect is configured so that the second operating device includes a second power-level detector configured to detect the second remaining level of the second electric power source. The controller is configured to receive the second power-level information based on the second remaining level detected by the second power-level detector.

With the operating system according to the twelfth aspect, it is possible to reliably obtain the second power-level information.

In accordance with a thirteenth aspect, the operating system according to the ninth aspect further comprises the additional electric device. The second operating device includes a second communicator configured to transmit the second control signal. The additional electric device includes an additional communicator configured to transmit the second control signal if the controller assigns the additional electric device the function of the second operating device.

With the operating system according to the thirteenth aspect, it is possible to reliably assign the additional electric device the function of the second operating device.

In accordance with a fourteenth aspect, the operating system according to the thirteenth aspect is configured so that the second communicator includes a second wireless communicator configured to wirelessly transmit the second control signal. The additional communicator includes an additional wireless communicator configured to wirelessly transmit the second control signal if the controller assigns the additional electric device the function of the second operating device.

With the operating system according to the fourteenth aspect, it is possible to wirelessly transmit the second control signal using the second wireless communicator and the additional wireless communicator. Thus, it is possible to omit an electric cable, simplifying the structure of the operating system.

In accordance with a fifteenth aspect, the operating system according to the thirteenth aspect is configured so that the second communicator includes a second communication port configured to be connected to a second electric cable. The second communicator is configured to transmit the second control signal via the second communication port. The additional communicator includes an additional communication port configured to be connected to an additional electric cable. The additional communicator is configured to transmit the second control signal via the additional communication port if the controller assigns the additional electric device the function of the second operating device.

With the operating system according to the fifteenth aspect, it is possible to transmit the second control signal using an electric cable. Thus, it is possible to reliably transmit the second control signal regardless of environmental radio wave.

In accordance with a sixteenth aspect, the operating system according to any one of the thirteenth to fifteenth aspects is configured so that the controller includes a communicator configured to communicate with the second communicator. The controller is configured to receive second communication-state information indicating a communication state between the communicator of the controller and the second communicator of the second operating device. The controller is configured to determine whether the second operating device meets the second predetermined condition based on the second communication-state information.

With the operating system according to the sixteenth aspect, it is possible to operate a component using the additional electric device if the second operating device meets the second predetermined condition based on the second communication-state information.

In accordance with a seventeenth aspect, the operating system according to any one of the first to sixteenth aspects is configured so that the first operating device includes a first user interface. The additional electric device includes an additional user interface. The controller is configured to assign, if the first operating device meets the first predetermined condition, the additional user interface a function of the first user interface.

With the operating system according to the seventeenth aspect, it is possible to operate a component using the additional user interface of the additional electric device if the first operating device meets the first predetermined condition.

In accordance with an eighteenth aspect, the operating system according to the seventeenth aspect is configured so that the first user interface includes a first electrical switch. The additional user interface includes a display and a virtual switch displayed on the display. The controller is configured to assign, if the first operating device meets the first predetermined condition, the virtual switch a function of the first electrical switch.

With the operating system according to the eighteenth aspect, it is possible to operate a component using the virtual switch of the additional electric device if the first operating device meets the first predetermined condition.

In accordance with a nineteenth aspect, the operating system according to any one of the first to eighteenth aspects further comprises a notification device configured to notify a user that the first operating device meets the first predetermined condition.

With the operating system according to the nineteenth aspect, it is possible to notify a user that the first operating device meets the first predetermined condition.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
   a base member configured to be coupled to a handlebar of the human-powered vehicle;
   a first electrical switch configured to receive a first user input indicating upshifting of a first gear changing device;
   a second electrical switch configured to receive a second user input indicating downshifting of the first gear changing device; and
   a third electrical switch configured to alternately receive a third user input and a third additional user input, the third user input indicating upshifting of a second gear changing device, the third additional user input indicating downshifting of the second gear changing device.

2. The operating device according to claim 1, further comprising
   a communicator electrically connected to the first electrical switch, the second electrical switch, and the third electrical switch.

3. The operating device according to claim 2, wherein
   the communicator is configured to generate a first control signal in response to the first user input received by the first electrical switch, the first control signal indicating upshifting of the first gear changing device.

4. The operating device according to claim 2, wherein
   the communicator is configured to generate a second control signal in response to the second user input received by the second electrical switch, the second control signal indicating downshifting of the first gear changing device.

5. The operating device according to claim 2, wherein
   the communicator is configured to alternately generate a third control signal and a third additional control signal in response to the third user input and the third additional user input alternately received by the third electrical switch, the third control signal indicating upshifting of the second gear changing device, the third additional control signal indicating downshifting of the second gear changing device.

6. The operating device according to claim 2, wherein
   the communicator includes a wireless communicator electrically connected to the first electrical switch, the second electrical switch, and the third electrical switch.

7. The operating device according to claim 6, wherein
   the wireless communicator is configured to wirelessly transmit a first control signal in response to the first user input received by the first electrical switch, the first control signal indicating upshifting of the first gear changing device.

8. The operating device according to claim 6, wherein
   the wireless communicator is configured to wirelessly transmit a second control signal in response to the second user input received by the second electrical switch, the second control signal indicating downshifting of the first gear changing device.

9. The operating device according to claim 6, wherein
   the wireless communicator is configured to wirelessly transmit alternately a third control signal and a third additional control signal in response to the third user input and the third additional user input alternately received by the third electrical switch, the third control signal indicating upshifting of the second gear changing device, the third additional control signal indicating downshifting of the second gear changing device.

10. The operating device according to claim 6, wherein
    the communicator includes a circuit board, and
    the wireless communicator is electrically mounted on the circuit board.

11. The operating device according to claim 2, further comprising
a battery holder electrically connected to the communicator.

12. The operating device according to claim 1, further comprising
an operating member movably coupled to the base member.

13. The operating device according to claim 12, wherein the operating member is pivotally coupled to the base member.

14. The operating device according to claim 12, wherein the first electrical switch is mounted to the operating member.

15. The operating device according to claim 12, wherein the second electrical switch is mounted to the operating member.

16. The operating device according to claim 1, wherein the third electrical switch is mounted to the base member.

17. The operating device according to claim 1, wherein
the base member includes a first end portion and a second end portion and extends between the first end portion and the second end portion, and
the third electrical switch is mounted to the first end portion of the base member.

18. The operating device according to claim 17, wherein the second end portion is configured to be coupled to the handlebar.

19. An operating system for a human-powered vehicle, comprising:
the operating device according to claim 1, the operating device comprising an operating member movably coupled to the base member; and
an additional operating device comprising:
an additional base member configured to be coupled to the handlebar of the human-powered vehicle; and
an additional operating member movably coupled to the additional base member.

20. An operating device for a human-powered vehicle, comprising:
a base member configured to be coupled to a handlebar of the human-powered vehicle;
a first electrical switch mounted on the base member and configured to receive a first user input indicating upshifting of a first gear changing device;
a second electrical switch mounted on the base member and configured to receive a second user input indicating downshifting of the first gear changing device; and
a third electrical switch mounted on the base member and configured to operate a second gear changing device to upshift in response to a third user input in a first state of the second gear changing device, the third electrical switch being configured to operate the second gear changing device to downshift in response to the third user input in a second state of the second gear changing device.

21. The operating device according to claim 1, wherein
the first electrical switch is mounted on the base member,
the second electrical switch mounted on the base member, and
the third electrical switch mounted on the base member.

* * * * *